(12) United States Patent
Inuo

(10) Patent No.: US 7,603,542 B2
(45) Date of Patent: Oct. 13, 2009

(54) RECONFIGURABLE ELECTRIC COMPUTER, SEMICONDUCTOR INTEGRATED CIRCUIT AND CONTROL METHOD, PROGRAM GENERATION METHOD, AND PROGRAM FOR CREATING A LOGIC CIRCUIT FROM AN APPLICATION PROGRAM

(75) Inventor: Takeshi Inuo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/561,941

(22) PCT Filed: Jun. 21, 2004

(86) PCT No.: PCT/JP2004/008709

§ 371 (c)(1),
(2), (4) Date: Feb. 15, 2006

(87) PCT Pub. No.: WO2005/001689

PCT Pub. Date: Jan. 6, 2005

(65) Prior Publication Data

US 2006/0155968 A1  Jul. 13, 2006

(30) Foreign Application Priority Data

Jun. 25, 2003  (JP) .............................. 2003-180659

(51) Int. Cl.
*G06F 9/30* (2006.01)
(52) U.S. Cl. ...................................................... 712/220
(58) Field of Classification Search .................. 712/220
See application file for complete search history.

(56) References Cited

U.S. PATENT DOCUMENTS 4,860,192 A * 8/1989 Sachs et al. .................... 711/3
(Continued)

FOREIGN PATENT DOCUMENTS

JP  8-316329  11/1996

(Continued)

OTHER PUBLICATIONS

K. Compton, S. Hauck, "Reconfigurable Computing: A Survey of Systems and Software", submitted to ACM Computing Surveys, 2000. Published ACM Computing Surveys, col. 34, No. 2, pp. 171-210, Jun. 2002.*

(Continued)

*Primary Examiner*—Eddie P Chan
*Assistant Examiner*—Keith Vicary
(74) *Attorney, Agent, or Firm*—Foley & Lardner LLP

(57) ABSTRACT

An application program is executed and is easily made reusable by dividing the application program into processing units, and by creating a logical circuit in the reconfigurable hardware by switching so as to improve the processing speed at low cost. The electronic computer comprises a processing device 70. The processing device 70 includes a processor 90 having reconfigurable hardware that can create a logical circuit with a program and a memory unit 80 storing a program used to decide creation of a logical circuit of the processor 90. The electronic computer further comprises a control device 60 that executes a command specified by the processing device 70. The processor 90 issues an instruction to execute the command when the processing device 70 detects a predetermined condition. The commands include a command that replaces the program stored in the memory unit 80 and a command that switches effective program data memories when the memory unit 80 is configured by a plurality of program data memories 81.

17 Claims, 32 Drawing Sheets

| PROCESS CONTENT | STATE | TRANSITION CONDITION | MOVES TO | PROGRAM DATA MEMORY USED | COMMAND SEQUENCE INTERMEDIATE CODE | |
|---|---|---|---|---|---|---|
| — | INITIAL STATE C0 | — | STATE C1 | 811 | load_prg 812, PM1<br>wait_prg 812, PM1<br>interrupt 71 , C1<br>activate 812<br>load_prg 813, PM2 | SQ0 |
| PROCESS P1 | STATE C1 | CONDITION F1 AND INTERRUPT VECTOR=C1 | STATE C2 | 812 | wait_prg 813, PM2<br>activate 813<br>load_prg 811, PM3 | SQ1 |
| | STATE C3 | CONDITION F3 AND INTERRUPT VECTOR=C3 | STATE C5 | | wait_prg 813, PM4<br>activate 813 | SQ3 |
| PROCESS P2 | STATE C2 | CONDITION F2a | STATE C3 | 813 | cancel_prg 811, PM3<br>interrupt 71 , C3<br>activate 812<br>load_prg 813, PM4 | SQ2a |
| | | CONDITION F2b | STATE C4 | | wait_prg 811, PM3<br>activate 811<br>load_prg 813, PM4 | SQ2b |
| PROCESS P3 | STATE C4 | CONDITION F4 | STATE C5 | 811 | wait_prg 813, PM4<br>activate 813 | SQ4 |
| PROCESS P4 | STATE C5 | CONDITION F5 | COMPLETION STATE C9 | 813 | halt 71 | SQ5 |

U.S. PATENT DOCUMENTS

| | | | | |
|---|---|---|---|---|
| 5,426,378 A | * | 6/1995 | Ong | 326/39 |
| 5,473,763 A | * | 12/1995 | Stewart et al. | 712/244 |
| 5,684,980 A | * | 11/1997 | Casselman | 703/23 |
| 5,760,602 A | * | 6/1998 | Tan | 326/38 |
| 5,887,189 A | * | 3/1999 | Birns et al. | 712/32 |
| 5,915,123 A | * | 6/1999 | Mirsky et al. | 712/16 |
| 6,023,564 A | * | 2/2000 | Trimberger | 703/23 |
| 6,034,538 A | | 3/2000 | Abramovici | |
| 6,077,315 A | * | 6/2000 | Greenbaum et al. | 717/157 |
| 6,105,105 A | * | 8/2000 | Trimberger | 711/103 |
| 6,288,566 B1 | * | 9/2001 | Hanrahan et al. | 326/38 |
| 6,326,806 B1 | * | 12/2001 | Fallside et al. | 326/38 |
| 6,438,737 B1 | * | 8/2002 | Morelli et al. | 716/16 |
| 6,571,381 B1 | * | 5/2003 | Vorbach et al. | 716/16 |
| 6,573,748 B1 | * | 6/2003 | Trimberger | 326/38 |
| 6,658,564 B1 | * | 12/2003 | Smith et al. | 713/100 |
| 6,836,839 B2 | * | 12/2004 | Master et al. | 712/29 |
| 2003/0056091 A1 | * | 3/2003 | Greenberg | 713/100 |
| 2003/0212940 A1 | * | 11/2003 | Wong | 714/725 |
| 2006/0004993 A1 | * | 1/2006 | Uriu et al. | 712/226 |

FOREIGN PATENT DOCUMENTS

| | | |
|---|---|---|
| JP | 9-218781 | 8/1997 |
| JP | 11-507478 | 6/1999 |
| JP | 11-184718 | 7/1999 |
| JP | 2000-040745 A | 2/2000 |
| JP | 2000-181566 | 6/2000 |
| JP | 3099889 | 8/2000 |
| JP | 2001-147802 A | 5/2001 |
| JP | 2001-331767 A | 11/2001 |

OTHER PUBLICATIONS

CORDS: Hardware-Software Co-Synthesis of Reconfigurable Real-Time Distributed Embedded Systems, Dick, R.P. Jha, N.K. Computer-Aided Design, 1998. ICCAD 98. Digest of Technical Papers. 1998 IEEE/ACM International Conference on Publication Date: Nov. 8-12, 1998; On pp. 62-68.*

Partitioning methodology for dynamically reconfigurable embedded systems; Harkin, J. McGinnity, T.M. Maguire, L.P. ; Computers and Digital Techniques, IEE Proceedings -Publication Date: Nov. 2000; vol. 147, Issue: 6; On pp. 391-396.*

Hardware-Software Co-Synthesis of Low Power Real-Time Distributed Embedded Systems with Dynamically Reconfigurable FPGAs; Shang, L. Jha, N.K. Design Automation Conference, 2002. Proceedings of ASP-DAC 2002. 7th Asia and South Pacific and the 15th International Conference on VLSI Design. Proceedings.Publication Date: 2002On pp. 345-352.*

A review of high-level synthesis for dynamically reconfigurable FPGAs; Xuejie Zhang[a,b,1,*], and Kam W. Ng[a]; Available online Jul. 14, 2000.*

Translated Abstract of JP362203236A; Fujimaki, 1987.*

* cited by examiner

FIG. 8

| COMMAND CODE NAME | COMMAND CODE PARAMETER | CONTENTS |
|---|---|---|
| activate | PROCESSING ELEMENT | SELECTS A SPECIFIED PROCESSING ELEMENT, STARTS A OPERATION |
| halt | PROCESSING DEVICE | HALTS A OPERATION OF A SPECIFIED PROCESSING DEVICE |
| interrupt | PROCESSING DEVICE AND INTERRUPT VECTOR NUMBER | ISSUES A SPECIFIED INTERRUPT VECTOR NUMBER TO A SPECIFIED PROCESSING DEVICE |
| load_prg | REGION OF PROGRAM DATA MEMORY AND MEMORY REGION WHERE PROGRAM DATA IS STORED | TRANSFERS A PROGRAM DATA STORED IN A SPECIFIED MEMORY REGION TO A REGION OF A SPECIFIED PROGRAM DATA MEMORY |
| cancel_prg | REGION OF PROGRAM DATA MEMORY AND MEMORY REGION WHERE PROGRAM DATA IS STORED | CANCELS A TRANSFER OF A PROGRAM DATA STORED IN A SPECIFIED MEMORY REGION TO A REGION OF A SPECIFIED PROGRAM DATA MEMORY |
| wait_prg | REGION OF PROGRAM DATA MEMORY AND MEMORY REGION WHERE PROGRAM DATA IS STORED | WAITS UNTIL A TRANSFER OF A PROGRAM DATA STORED IN A SPECIFIED MEMORY REGION TO A REGION OF A SPECIFIED PROGRAM DATA MEMORY IS COMPLETE |

FIG . 10

| ADDRESS | DATA |
|---|---|
| ADDRESS 1 | COMMAND CODE 1 |
| ADDRESS 2 | COMMAND CODE 2 |
| : | :    A10 |

FIG . 12

| ADDRESS | DATA | | |
|---|---|---|---|
| ADDRESS 1 | ADDRESS COUNTER CONTROL CODE 1 | FLAG 1 | COMMAND CODE 1 |
| ADDRESS 2 | ADDRESS COUNTER CONTROL CODE 2 | FLAG 2 | COMMAND CODE 2 |
| | A20 : | A30 | A10 |

FIG.14

| ADDRESS COUNTER CONTROL CODE NAME | ADDRESS COUNTER CONTROL CODE PARAMETER | CONTENTS |
|---|---|---|
| load_adr | N | SETS N AS THE VALUE OF THE ADDRESS COUNTER |
| add_adr | N | ADDS N TO THE VALUE OF THE ADDRESS COUNTER |
| push_adr | N | HIDES THE VALUE OF THE ADDRESS COUNTER IN THE ADDRESS COUNTER STACK AND SETS N AS A NEW VALUE |
| pop_adr | | RETURNS THE VALUE OF THE ADDRESS COUNTER FROM THE ADDRESS COUNTER STACK |

N: NUMERICAL VALUE

FIG .15

| ADDRESS | DATA ||
| --- | --- | --- |
| | ADDRESS COUNTER CONTROL CODE AND FLAG | COMMAND CODE |
| ⋮ | ⋮  X100 | ⋮  Y100 |
| 100 | add_adr 1 \| cont | COMMAND CODE 100 |
| 101 | load_adr 200 \| cont | COMMAND CODE 101 |
| ⋮ | ⋮  X200  X101 | Y200  Y101 |
| 200 | add_adr 1 \| stop | COMMAND CODE 100 |
| 201 | ADDRESS COUNTER CONTROL CODE 201 | COMMAND CODE 101 |
| ⋮ | ⋮ | |

FIG. 20

| PROCESS CONTENT | STATE | TRANSITION CONDITION | MOVES TO | PROGRAM DATA MEMORY USED | COMMAND SEQUENCE INTERMEDIATE CODE | |
|---|---|---|---|---|---|---|
| — | INITIAL STATE C0 | — | STATE C1 | 811 | load_prg 812, PM1<br>wait_prg 812, PM1<br>interrupt 71 , C1<br>activate 812<br>load_prg 813, PM2 | ~SQ0 |
| PROCESS P1 | STATE C1 | CONDITION F1 AND INTERRUPT VECTOR=C1 | STATE C2 | 812 | wait_prg 813, PM2<br>activate 813<br>load_prg 811, PM3 | ~SQ1 |
|  | STATE C3 | CONDITION F3 AND INTERRUPT VECTOR=C3 | STATE C5 | 813 | wait_prg 813, PM4<br>activate 813 | ~SQ3 |
| PROCESS P2 | STATE C2 | CONDITION F2a | STATE C3 |  | cancel_prg 811, PM3<br>interrupt 71 , C3<br>activate 812<br>load_prg 813, PM4 | ~SQ2a |
|  |  | CONDITION F2b | STATE C4 | 811 | wait_prg 811, PM3<br>activate 811<br>load_prg 813, PM4 | ~SQ2b |
| PROCESS P3 | STATE C4 | CONDITION F4 | STATE C5 |  | wait_prg 813, PM4<br>activate 813 | ~SQ4 |
| PROCESS P4 | STATE C5 | CONDITION F5 | COMPLETION STATE C9 | 813 | halt 71 | ~SQ5 |

FIG. 22

| BASE ADDRESS VALUE | OFFSET VALUE | COMMAND SEQUENCE ||  |
|---|---|---|---|---|
| | | ADDRESS COUNTER CONTROL CODE | | COMMAND CODE |
| ADR000 | +0 | add_adr 1 | cont | load_prg 812, PM1 |
| | +1 | add_adr 1 | cont | wait_prg 812, PM1 |
| | +2 | add_adr 1 | cont | interrupt 71 , C1 |
| | +3 | add_adr 1 | cont | activate 812 |
| | +4 | add_adr 0 | stop | load_prg 813, PM2 |
| ADR001 | +0 | add_adr 1 | cont | wait_prg 813, PM2 |
| | +1 | add_adr 1 | cont | activate 813 |
| | +2 | add_adr 0 | stop | load_prg 811, PM3 |
| ADR002 | +0 | add_adr 1 | cont | cancel_prg 811, PM3 |
| | +1 | add_adr 1 | cont | interrupt 71 , C3 |
| | +2 | add_adr 1 | cont | activate 812 |
| | +3 | load_adr ADR004 | stop | load_prg 813, PM4 |
| ADR003 | +0 | add_adr 1 | cont | wait_prg 811, PM3 |
| | +1 | add_adr 1 | cont | activate 811 |
| | +2 | load_adr ADR004 | stop | load_prg 813, PM4 |
| ADR004 | +0 | add_adr 1 | cont | wait_prg 813, PM4 |
| | +1 | add_adr 1 | stop | activate 813 |
| | +2 | add_adr 0 | stop | halt 71 |

```
PM0 IS STORED IN THE PROGRAM DATA MEMORY 811
THE PROGRAM DATA MEMORY 811 IS ACTIVATED
```

FIG. 27

| BASE ADDRESS VALUE | OFFSET VALUE | COMMAND SEQUENCE | | |
|---|---|---|---|---|
| | | ADDRESS COUNTER CONTROL CODE | COMMAND CODE | |
| ADR000 | +0 | add_adr 1 | cont | load_prg 812, PM1 | SQ0 |
| | +1 | add_adr 1 | cont | wait_prg 812, PM1 | |
| | +2 | add_adr 1 | cont | interrupt 71 , C1 | |
| | +3 | add_adr 1 | cont | activate 812 | |
| | +4 | add_adr 0 | stop | load_prg 813, PM2 | |
| ADR001 | +0 | add_adr 1 | cont | wait_prg 813, PM2 | SQ1 |
| | +1 | add_adr 1 | cont | activate 813 | |
| | +2 | add_adr 0 | stop | load_prg 811, PM3 | |
| ADR002 | +0 | add_adr 1 | cont | cancel_prg 811, PM3 | SQ2a |
| | +1 | add_adr 1 | cont | interrupt 71 , C3 | |
| | +2 | add_adr 1 | cont | activate 812 | |
| | +3 | load_adr ADR004 | stop | load_prg 813, PM4 | |
| ADR003 | +0 | add_adr 1 | cont | wait_prg 811, PM3 | SQ2b |
| | +1 | add_adr 1 | cont | activate 811 | |
| | +2 | load_adr ADR004 | stop | load_prg 813, PM4 | |
| ADR004 | +0 | add_adr 1 | cont | wait_prg 813, PM4 | SQ3,SQ4 |
| | +1 | add_adr 1 | stop | activate 813 | |
| | +2 | add_adr 1 | cont | halt 71 | SQ5B |
| | +3 | add_adr 0 | stop | interrupt 72,END71 | |

RECONFIGURABLE ELECTRIC COMPUTER, SEMICONDUCTOR INTEGRATED CIRCUIT AND CONTROL METHOD, PROGRAM GENERATION METHOD, AND PROGRAM FOR CREATING A LOGIC CIRCUIT FROM AN APPLICATION PROGRAM

TECHNICAL FIELD

The present invention relates to an electronic computer, semiconductor integrated circuit, control method, program generation method, and program, and a technology for executing a part or all of processing by an application program at high speed using reconfigurable hardware.

BACKGROUND OF THE INVENTION

In order to execute an application program beyond the processing capability of a CPU, the technique using special-purpose hardware has been conventionally proposed/developed. FIG. 30 shows a technique in which special-purpose hardware executes the whole application program. FIG. 31 shows a technique in which special-purpose hardware is prepared to execute a part of an application program having the hardware connected to a general-purpose CPU via a network, and a part of the application is executed by the hardware at high speed. FIG. 32 shows a technique in which a part of an application program is executed by special purpose hardware, and by adding a new instruction set that has the special purpose hardware execute processing within a CPU, the part executed by the newly added instructions is processed at high speed. While the techniques described above in which all or a part of an application is implemented in hardware improve the processing capability a great deal, they require large costs because a new piece of hardware needs to be developed/manufactured for every application. Meanwhile, reconfigurable hardware where logic circuits such as FPGA (Field Programmable Gate Array) and PLD (Programmable Logic Device) can be created by a program has drawn some attention because it can execute particular processing specified by a program by changing the program and reconfiguring the logic circuit without changing devices. In recent years, methods for realizing an application program that requires high processing capability using reconfigurable hardware, instead of special purpose hardware, without having to newly manufacture hardware (i.e. low costs) and devices using these methods have been proposed. For example, reconfigurable hardware is used instead of special purpose hardware in Japanese Patent Kokai Publications No. JP 8-316329A and No. JP 11-184718A. Further, extended instructions added to a CPU are realized by reconfigurable hardware in JP 3099889B.

[Patent Document 1]
Japanese Patent Kokai Publication No. JP-A-8-316329

[Patent Document 2]
Japanese Patent Kokai Publication No. JP-A-11-184718

[Patent Document 3]
Japanese Patent No. 3099889

[Patent Document 4]
Japanese Patent Kokai Publication No. JP-P2001-147802A

[Patent Document 5]
Japanese Patent Kohyo Publication No. JP-A-11-507478

BRIEF SUMMARY OF THE INVENTION

Since the above-mentioned conventional techniques do not consider the capacity of logic circuits created in reconfigurable hardware, an application program that exceeds the capacity of the reconfigurable hardware cannot be implemented. Therefore, the size of an application program is proportional to the size of the reconfigurable hardware in which the application program is implemented, resulting in high costs.

Meanwhile, when an application program is implemented in reconfigurable hardware with small capacity in order to reduce costs, the application program needs to be divided considering the size of the logic circuit that can be implemented in the hardware resource. However, divided programs and the control between these programs greatly depend on the architecture where the programs are implemented. Therefore, the divided programs and the control between these programs cannot be reused once the architecture has been changed, reducing design efficiency greatly.

Further, the adequacy of the application program division (whether or not it can be implemented in the reconfigurable or reconstructable hardware) is not clear until the last stage of the reconfigurable hardware realization i.e. when the logic circuits are mapped onto the reconfigurable hardware, and if an improper division such as one exceeding the implementable size occurs, a great deal of redesigning will be necessary, reducing design efficiency considerably.

Further, as described in Japanese Patent Kokai Publication No. JP-P2001-147802A and Japanese Patent Kohyo Publication No. JP-A-11-507478, when the control between divided processing operations is controlled by a CPU external to reconfigurable hardware, the control between divided processing operations is reusable as program data of the CPU, however, the divided processing operations are not since they depend on the architecture of the reconfigurable hardware, where the application program is implemented, and the implementable capacity. Further, since the control between the processing operations is performed by the CPU, a waiting time such as the overhead of a system call occurs between the CPU and the reconfigurable hardware, resulting in performance degradation. The more the scale of the application program increases, the more serious these problems become.

It is an object of the present invention to provide an electronic computer, control method, program generation method, and program wherein an application program is executed and is easily made reusable by dividing the application program into processing units, and by creating a logical circuit for every processing unit in reconfigurable (or reconstructable) hardware by switching so as to improve the processing speed at low cost.

Means to Solve the Problem

A first electronic computer of the present invention is characterized in that it comprises a processing device including reconfigurable (or reconstructable) hardware that can create a logic circuit with a program and a control device executing a command specified by the processing device, and the command is instructed to be executed when the processing device detects a predetermined condition and includes a command for execution of switching programs logically creating the reconfigurable hardware.

A second electronic computer of the present invention in the first electronic computer of the present invention is characterized in that the processing device comprises a plurality of banks (each) having a processing element with reconfigurable hardware and at least one program data memory holding a program that creates a logic circuit in the reconfigurable hardware, and an effective bank selection unit selecting one bank from the plurality of banks, making it effective and connecting it to the outside.

A third electronic computer of the present invention in the first electronic computer of the present invention is characterized in that the processing device comprises a bank including a processing element that includes reconfigurable hardware, a plurality of program data memories (each) holding a program that creates a logic circuit in the reconfigurable hardware, and an effective block selection unit selecting one memory from the plurality of program data memories and making it effective.

A fourth electronic computer of the present invention in the second or third electronic computer of the present invention is characterized in that at least one processing element of the processing device is comprised of reconfigurable hardware and the other processing elements are (each) comprised of reconfigurable hardware or a general-purpose CPU.

A fifth electronic computer of the present invention in the second, third, or fourth electronic computer of present invention is characterized in that the control device interprets and executes an activate command specifying the effective bank in case where there is a plurality of the banks, and specifying the effective program data memory and activating operation of the specified processing element when there is a plurality of the program data memories; a halt command halting operation of the specified processing device; an interrupt command issuing an interrupt vector from the control device to the specified processing device; a load_prg command transferring program data from a specified memory device to the program data memory; a cancel_prg command canceling the load_prg instruction; and a wait_prg command waiting until completion of the load_prg instruction.

A sixth electronic computer of the present invention in the first, second, third, fourth, or fifth electronic computer of present invention is characterized by comprising a command code memory holding commands that the control device executes wherein the control device comprises a command code reference device reading commands from the command code memory according to an address specified by the processing device, interpreting, and executing it.

A seventh electronic computer of the present invention in the sixth electronic computer of present invention is characterized in that the command code reference device comprises an address counter holding the address of the command code memory, and in the exchange of commands between the processing device and the control device, a first address control line indicating that an address signal line outputted by the processing device is effective, and a second address counter control line instructing whether the value of the address signal line is stored in the address counter as it is or the result of adding the value of the address signal line to the value of the address counter is stored in the address counter when the first control line is effective.

An eighth electronic computer of the present invention in the seventh electronic computer of the present invention is characterized in that the commands are stored in the command code memory in a format comprising a command code that classifies the commands, an address counter control code, and a flag that indicates whether or not the following command is executed, and the address counter control code includes a load_adr command setting the value of the address counter and a add_adr command adding a specified value to the address counter.

A ninth electronic computer of the present invention in the eighth electronic computer of the present invention is characterized in that the address counter control code includes a push_adr command that hides (stores as a sidetruck) the address counter in an address counter stack provided in the control device and that sets a new value to the address counter, and a pop_adr command that returns the value of the address counter stack to the address counter.

A tenth electronic computer of the present invention in any one of the first through ninth electronic computers of the present invention is characterized by comprising a cache device including a cache memory that temporarily holds data to be transferred to the processing device and a cache controller that controls the cache memory wherein the cache controller is controlled by a command issued by the processing device.

An eleventh electronic computer of the present invention in the tenth electronic computer of the present invention is characterized in that the cache device comprises an address translation device that translates an address defined externally to the processing device into an address defined inside of the processing device, and the address translation device is controlled by a command issued by the processing device.

A twelfth electronic computer of the present invention comprises a processing device including reconfigurable hardware that can create a logic circuit with a program, and a control device executing a command specified by the processing device; the command is instructed to be executed when the processing device detects a, predetermined condition and includes a command that executes switching programs logically creating the reconfigurable hardware; and the processing device comprises a second processing device including reconfigurable hardware that can create a logic circuit with a program and a second control device executing a command specified by the second processing device.

A semiconductor integrated circuit of the present invention implements any one of the first through eleventh electronic computers of the present invention.

In a first control method of the present invention, when a processing device including reconfigurable hardware that can create a logic circuit with a program detects a predetermined condition, it issues an instruction to execute a command, and a control device that has received the command execution instruction from the processing device switches programs that logically creates reconfigurable hardware.

A second control method of the present invention in the first control method of the present invention is characterized in that after the switching, while a program in a predetermined program data memory is being executed, a next program is read into another program data memory.

In a third control method of the present invention, a processing device issues an instruction to execute a command when a predetermined condition is detected, wherein the processing device includes reconfigurable hardware, a plurality of program data memories that hold programs creating logic circuits of the reconfigurable hardware, and an effective block selection unit that selects one program data memory from the plurality of program data memories and that makes it effective; and a control device that has received the command execution instruction from the processing device executes an activate command controlling the effective block selection unit so as to make the specified program data memory effective and connecting it to the reconfigurable hardware; and switching of the content of a logic circuit executed by the reconfigurable hardware is executed.

A fourth control method of the present invention in the second control method of the present invention is characterized in that the control device executes;

a halt command halting the operation of the specified processing device;

an interrupt command issuing an interrupt vector from the control device to the specified processing device;

a load_prg command transferring program data from a specified memory device to the program data memory;

a cancel_prg command canceling the load_prg instruction; and a wait_prg command waiting until the completion of the load_prg instruction.

A first program generation method of the present invention comprises; a control flow analysis procedure in which the control flow of an application program is analyzed, the application program is divided into processing units, and a command sequence intermediate code combining commands controlled by reconfigurable hardware that executes the divided processing units within an electronic computer is generated;

a command sequence implementation procedure in which a command sequences is generated by translating the command sequence intermediate code into a form that can be executed by the electronic computer; and a program data generation procedure in which the operational content of a processing unit is translated into a form that can be executed by the electronic computer.

A second program generation method of the present invention in the first program generation method of the present invention is characterized in that the application program is divided so that each processing unit can be stored in a program data memory that holds a program creating a logic of the reconfigurable hardware when the control flow of the application program is analyzed and divided into processing units in the control flow analysis procedure.

A first program of the present invention is characterized by having a computer execute a procedure in which, when a processing device including reconfigurable hardware that can create a logic circuit with a program detects a predetermined condition and issues an instruction to execute a command, a control device that has received the command execution instruction from the processing device executes switching programs logically creating the reconfigurable hardware.

A second program of the present invention is characterized by having a computer execute a procedure in which, when a processing device including reconfigurable hardware, a plurality of program data memories that hold programs creating logic circuits of the reconfigurable hardware, and an effective block selection unit that selects one program data memory from the plurality of program data memories and that makes it effective detects a predetermined condition and issues an instruction to execute a command, a control device that has received the command execution instruction from the processing device executes an activate command that controls the effective block selection unit so as to make the specified program data memory effective and that switches connection to the reconfigurable hardware.

A third program of the present invention in the second program of the present invention is characterized by having a computer execute a procedure in which a halt command halting operation of the specified processing device, an interrupt command issuing an interrupt vector from the control device to the specified processing device, a load_prg command transferring program data from a specified memory device to the program data memory, a cancel_prg command canceling the load_prg instruction, and a wait_prg command waiting until the completion of the load_prg instruction are executed.

BRIEF DESCRIPTION OF THE DRAWINGS

FIG. 8 is a table showing the functions of the command codes implemented in the control device of the embodiment of the present invention.

FIG. 10 is a diagram showing an example of how the command of the embodiment of the present invention is stored.

FIG. 12 is a diagram showing an example of how the command of the embodiment of the present invention is stored.

FIG. 14 is a diagram showing a functional example of the address counter control code of the embodiment of the present invention.

FIG. 15 is a diagram showing a command sequence of the embodiment of the present invention.

FIG. 20 is a diagram showing a command sequence intermediate code of the embodiment of the present invention.

FIG. 22 is a diagram showing command sequences assigned to a command code memory.

FIG. 24 is a diagram showing the state of an electronic computer of the embodiment of the present invention when the power is turned on.

FIG. 27 is a diagram showing a command sequence assigned to the memory of the embodiment of the present invention.

DETAILED DESCRIPTION OF THE INVENTION

Figure 1:
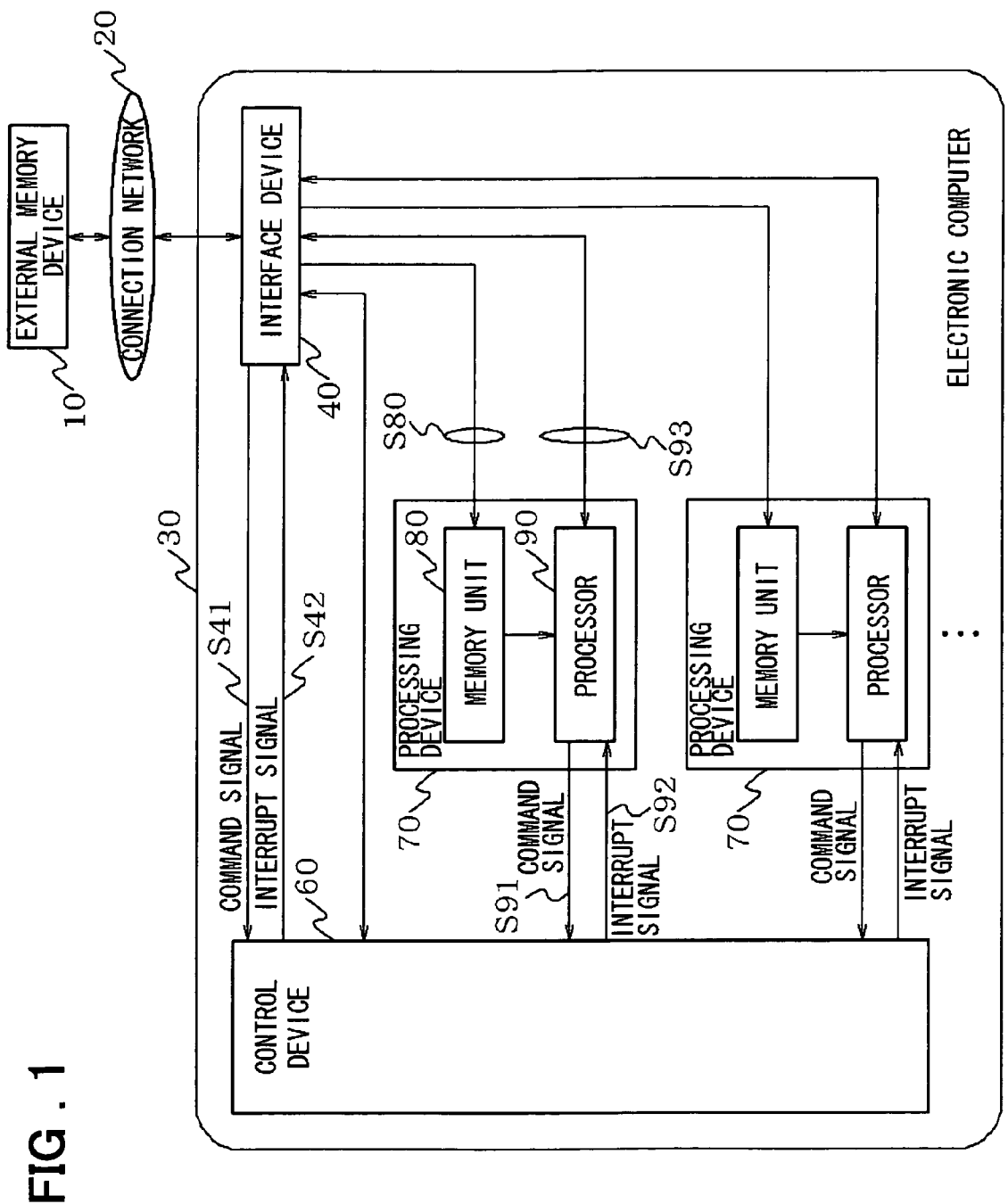
FIG. 1 is a block diagram illustrating the structure of an embodiment of the present invention.

Embodiments of the present invention will be described in detail with reference to the drawings. FIG. 1 is a block diagram illustrating the basic structure of an electronic computer of an embodiment of the present invention. The electronic computer 30 of the first embodiment of the present invention comprises an interface device 40 controlling the interface to the outside and transferring data, a processing device 70 performing part or all of the processing of an application program, and a control device 60 executing a command specified by the processing device 70, and is connected to an external memory device 10 via a connection network 20. The electronic computer 30 in FIG. 1 comprises two of the processing devices 70, however, it may comprise just one, three or more.

Figure 2:
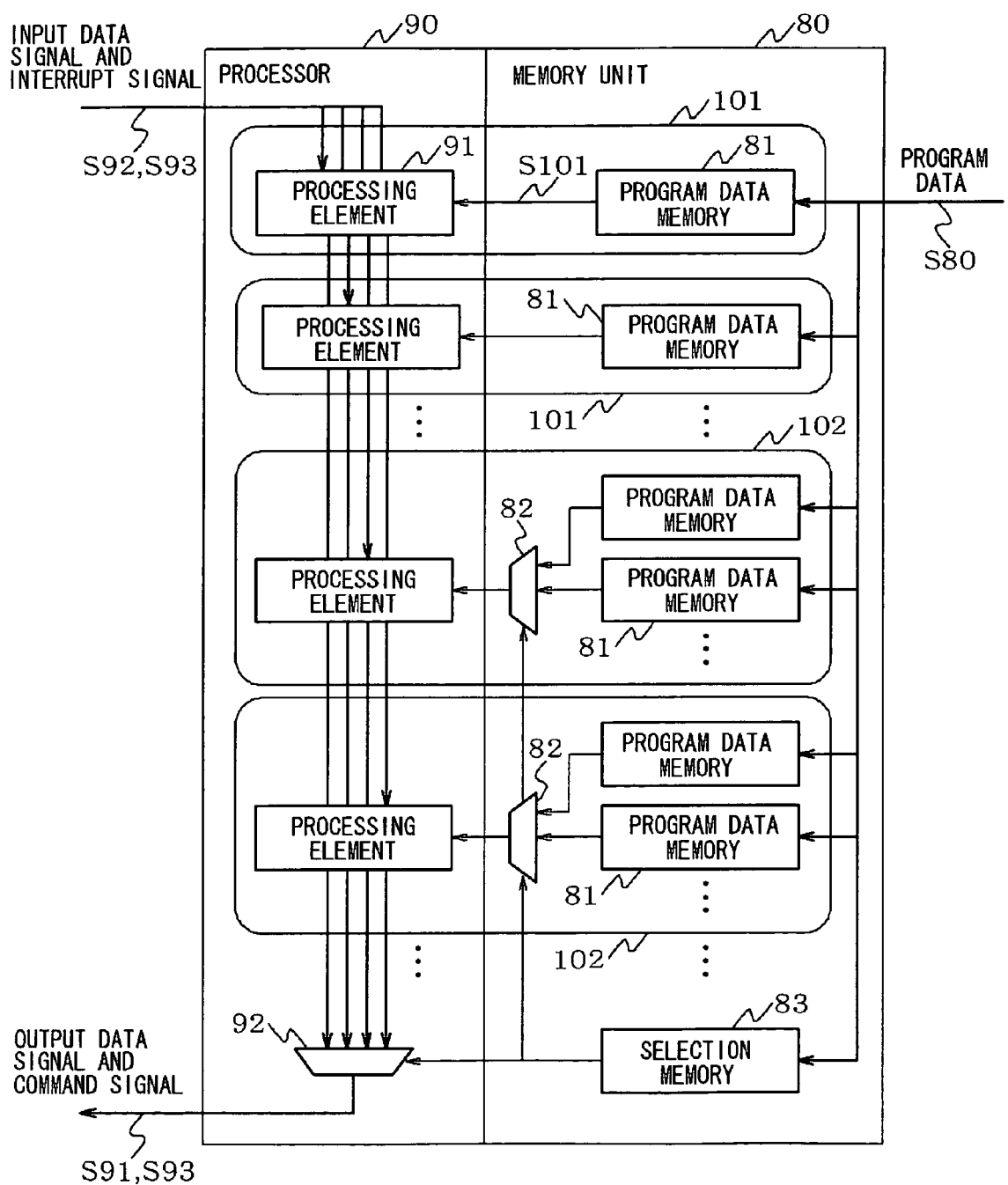
FIG. 2 is a block diagram showing an example of a processing device of the embodiment of the present invention.

The processing device 70 is made up of a memory unit 80 and a processor 90. FIG. 2 is a diagram showing a structural example of the processing device 70, and as constituent elements, there are a bank 101 made up of a processing element 91 and a program data memory 81, a bank 102 wherein a plurality of the selectable program data memories 81 are provided for one processing element 91, a selection memory 83, and an effective block selection unit 82 that select one processing element from the multiple processing elements 91 and output it.

In FIG. 2, the processing device 70 comprises two of the banks 101 and two of the banks 102, however, it suffices as long as it comprises at least one of the banks 101 or 102. Further, when there is only one bank, the effective block selection unit 82 may be omitted, and when it comprises only one bank and one program data memory 81, the selection memory 83 may be omitted.

A program data signal S80 inputted into the processing device 70 is connected (supplied) to the program data memories 81 and the selection memory 83. The program data memory 81 is a memory that holds a program for determining the processing content of the processing element 91. The program held by the program data memory 81 is normally stored in the external memory device 10, is transferred when necessary via the connection network 20, the interface device 40, and the program data signal S80, and written into the program data memory 81. Further, when the processing element 91 is reconfigurable hardware such as an FPGA, the program held by the program data memory 81 becomes a program for creating a logic circuit of the processing element 91.

Figure 3:
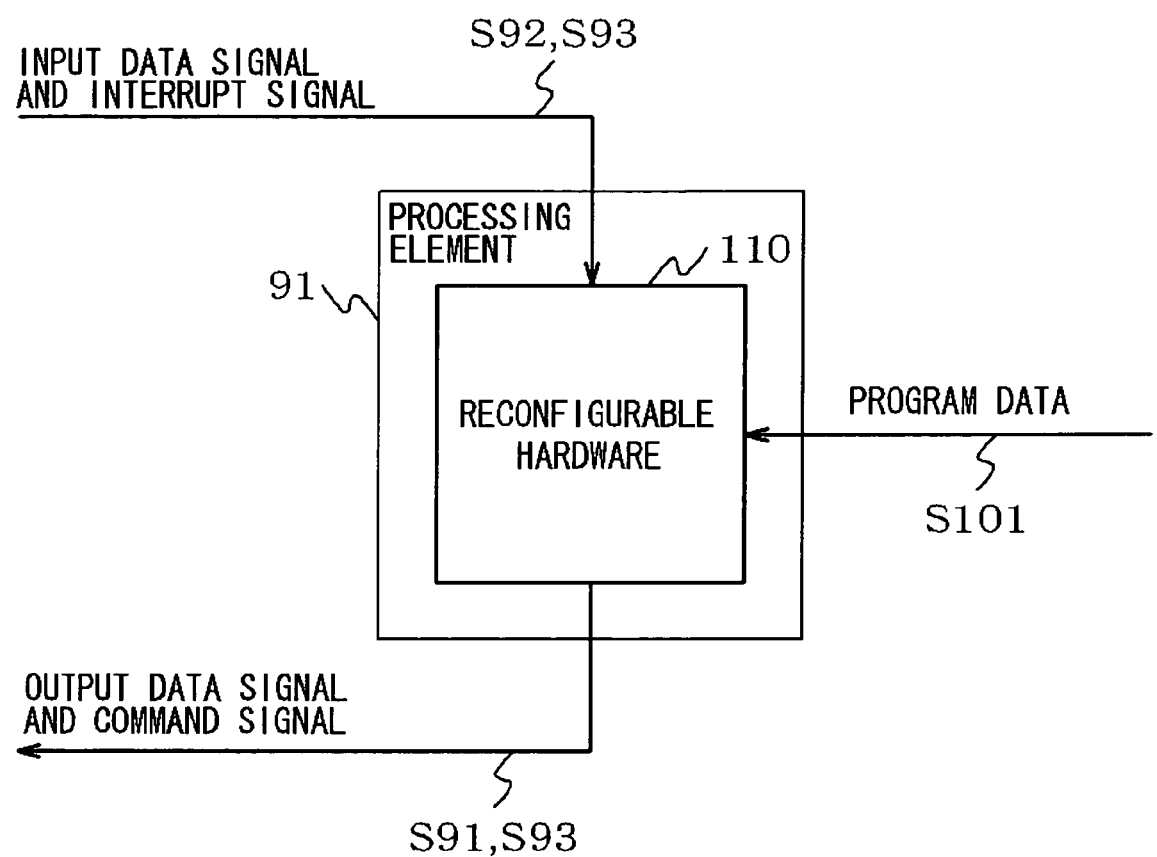
FIG. 3 is a diagram showing an example of a processing element of the embodiment of the present invention.
Figure 4:
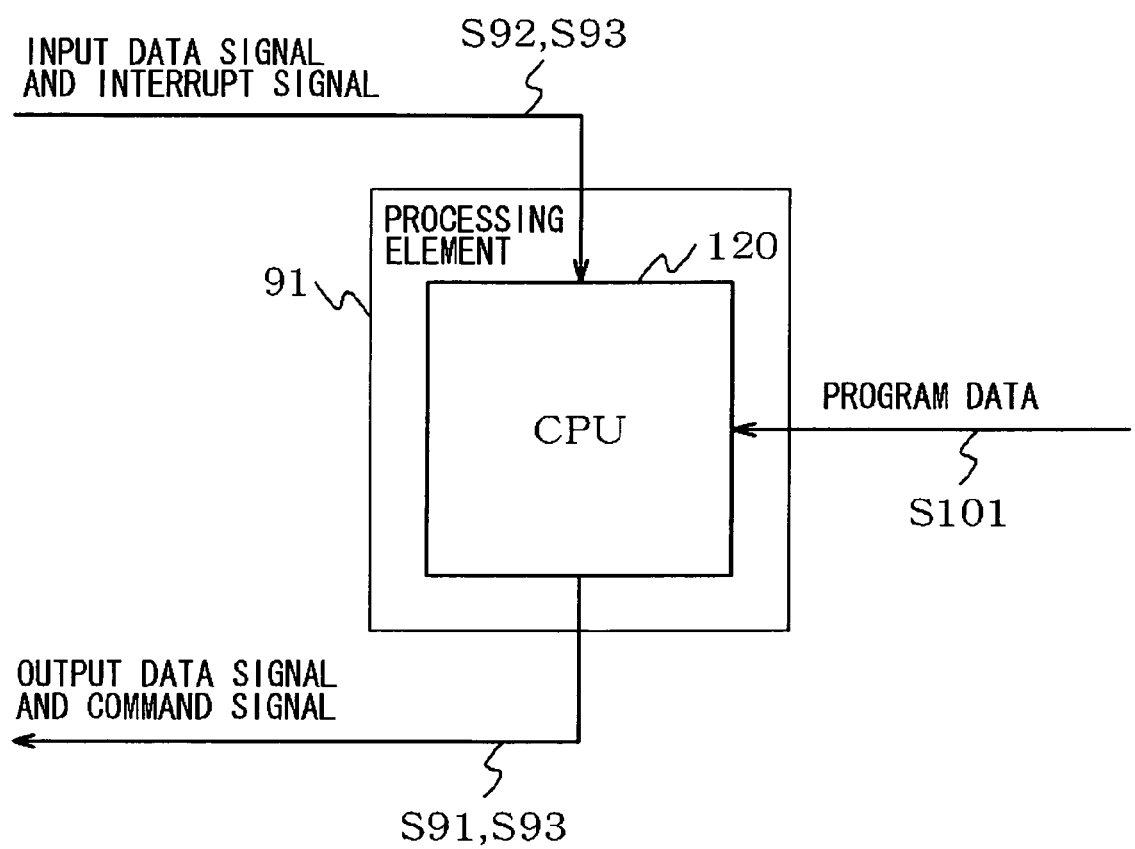
FIG. 4 is a diagram showing an example of a processing element of the embodiment of the present invention.

The processing element 91 performs processing according to the program held in the program data memory 81 connected to it. This can be realized by reconfigurable hardware as shown in FIG. 3 for instance, however, it may also be realized by a CPU as shown in FIG. 4.

The selection memory 83 is connected to an effective bank selection unit 92 and the effective block selection unit 82, and holds information for selecting a bank to be made effective in the processing device 70 and for selecting a program data memory 81 to be made effective in a bank constituted by a plurality of the program data memories 81 such as the bank 102. Since switching to a program data memory 81 is done instantly, the processing element 91 can instantly start the processing corresponding to a new program if the selected program data memory 81 has ended storing the program. However, if it has not ended storing the program, it will be necessary to wait until the data is transferred and the program is stored.

A command signal S91 outputted from the processing device 70 is generated by the processing element 91 of the processing device 70. An interrupt signal S92 inputted into the processing device 70 is inputted into the processing element 91 of the processing device 70, and is used during the processing process. A processing data signal S93 inputted into/outputted from the processing device 70 is connected to the processor 90, and is used as data necessary for processing and input/output line for processed data.

The command signal S91, the interrupt signal S92 and the processing data signal S93 are inputted into/outputted from the processor 90 of the bank made effective by the selection memory 83 when the processing device 70 comprises a plurality of banks. Although all the data inputted into the processing device 70 are connected to all the processors 90 in FIG. 2, the selection memory 83 may control so as to cut some of the inputted data so that the data are not inputted into ineffective banks.

Next, each of the constituent elements 91 will be described in detail. As shown in FIG. 3, the processing element 91 is made up of reconfigurable hardware such as FPGA and PLD. When there is a plurality of the constituent [processing] elements 91, one or multiple of them may be constituted by a CPU 120 as shown in FIG. 4. The constituent elements 91 constituted by the CPU 120 is primarily used to perform the processing of an application program by assigning part of it to be processed by a high-level language program and to perform control within the processing device 70. When the processing element 91 is constituted by the CPU 120, a program data connection line S110 in FIG. 4 may be omitted since a program can be read via the processing data signal S93.

Figure 5:
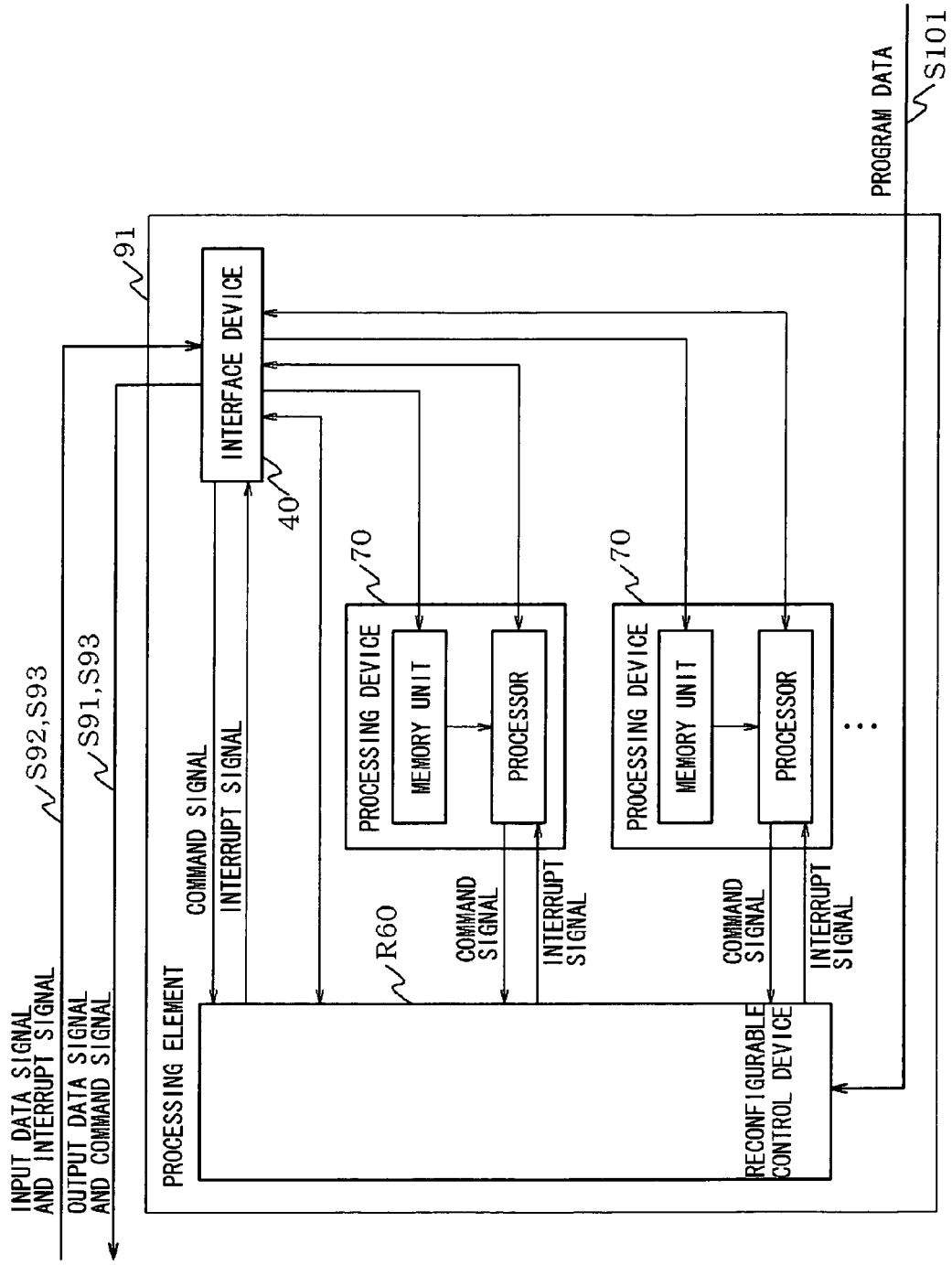
FIG. 5 is a diagram showing an example of a processing element of the embodiment of the present invention.

As shown in FIG. 5, the control device 60 of the electronic computer 30 may be realized with reconfigurable hardware using a reconfigurable control device R60. As shown in FIG. 5, the reconfigurable control device R60 is set using a program data connection line S101, and the content of processing can be varied according to the content set. Further, the command signal S91, the interrupt signal S92, and the processing data signal S93 are inputted/outputted via the interface device 40.

The interface device 40 connects the processing device 70 and the control device 60 to the connection network 20 external to the electronic computer 30, and outputs a command signal S41 to the control signal 60 based on a proper protocol of the connection network 20 when the communication from the connection network 20 to the electronic computer 30 about the control occurs. When the communication from the control device 60 to the interface device 40 regarding the control of an interrupt signal S42 occurs, it similarly relays the message to the specified connection target via the connection network 20 using the proper protocol.

Figure 6:
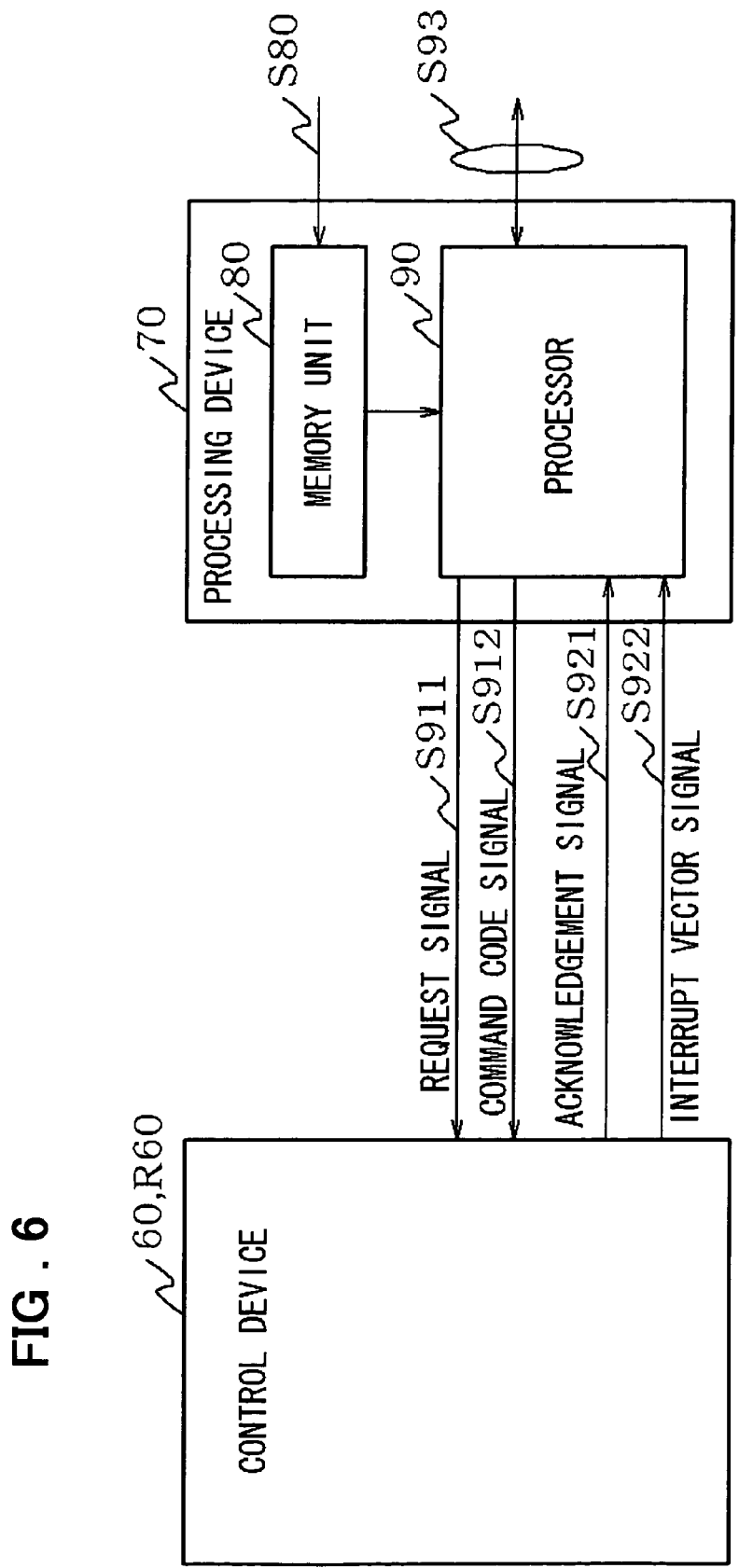
FIG. 6 is a diagram showing an example of how a control device and the processing element are connected in the embodiment of the present invention.

When an access from the inside of the electronic computer 30 to the outside occurs, the interface device 40 accesses the outside based on the proper protocol. When an access from the outside of the electronic computer 30 to the processing device 70 occurs, the interface device 40 accesses based on the proper protocol. The control device 60 receives the command signal S41 sent from a device external to the electronic computer 30 via the interface device 40 and the command signal S91 outputted from the processing device 70, interprets, and executes the received command. An example of a protocol when the processing device 70 issues the command signal S91 to the control device 60 is shown in FIG. 6. This protocol may be applied as a protocol between the interface device 40 and the control device 60.

FIG. 6 is a diagram showing a method in which the processing device 70 directly sends a command code signal S912 along with a request signal S911. The control device 60 receives the command code signal S912, performs processing according to the content of the command code, and returns a acknowledgement signal S921 when the processing is ended.

Figure 7:
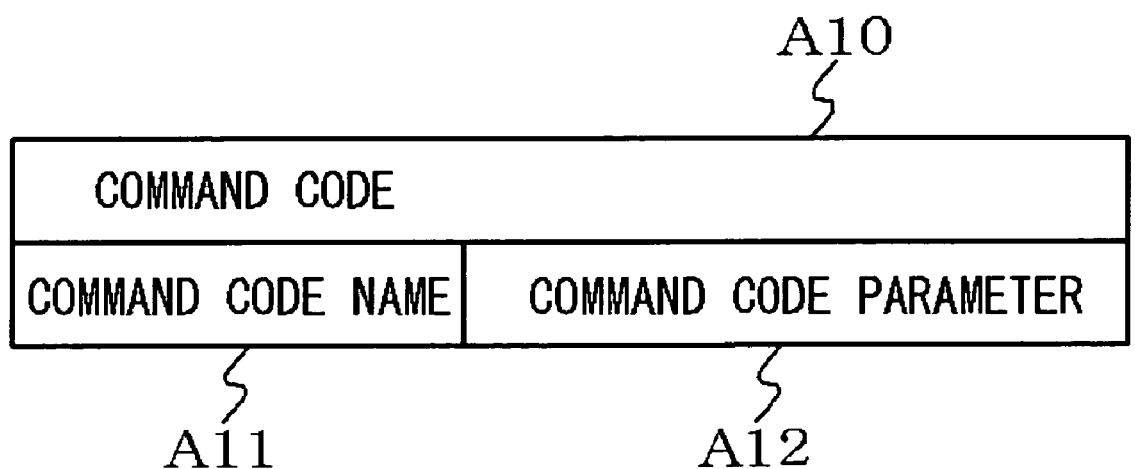
FIG. 7 is a diagram illustrating the structure of a command code implemented in the control device of the embodiment of the present invention.

An example of the command code that the control device 60 interprets and executes is shown in FIGS. 7 and 8. FIG. 7 is a diagram showing the structure of the command code, and a command code A 10 is made up of a command code name A11 and a command code parameter A12. FIG. 8 is a table showing the execution contents of commands and shows six commands, which will be explained hereinafter.

"Activate" controls the effective bank selection unit 92 and the effective block selection unit 82 by writing a code specified by the command code parameter A12 into the selection memory 83 and connects the selected program data memory 81 to the processing element 91 in the same bank. For instance, when the processing element 91 is constituted by reconfigurable hardware as shown in FIG. 3, "activate" means setting the program data into the reconfigurable hardware, and the activated reconfigurable hardware starts processing according to the content of the program data memory 81 right away.

"Halt" halts the operation of the processing device 70 specified by the command code parameter A12.

"Interrupt" issues a specified interrupt vector signal S922 to the processing device 70 specified by the command code parameter A12.

"Load_prg" transfers the program data stored in the external memory device 10 and other optional memory device to the region of the program data memory 81 specified by the command code parameter A12. "Cancel_prg" cancels the transfer started by "load_prg". "Wait_prg" waits until the transfer started by "load_prg" is complete.

The control device 60 interprets any command set of the commands shown in FIG. 8, performs proper processing for each command, and outputs an interrupt signal including a acknowledgement signal to the outside of the electronic computer 30 via the processing device 70 and the interface device 40. The interpretation of the commands, processing, and interruption may be performed for each processing device 70 in parallel.

Figure 9:
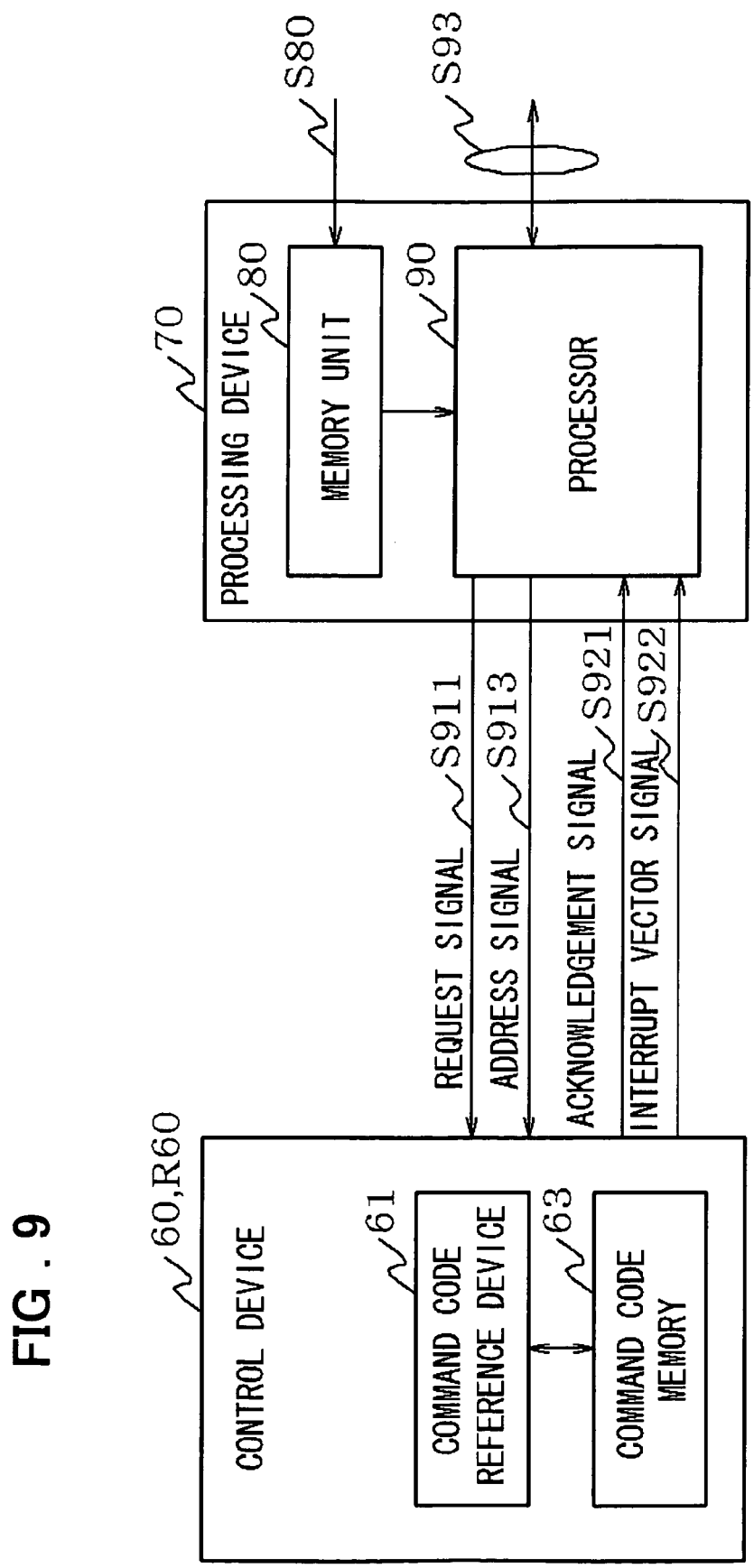
FIG. 9 is a diagram showing an example of how the control device and the processing element are connected in the embodiment of the present invention.
Figure 11:
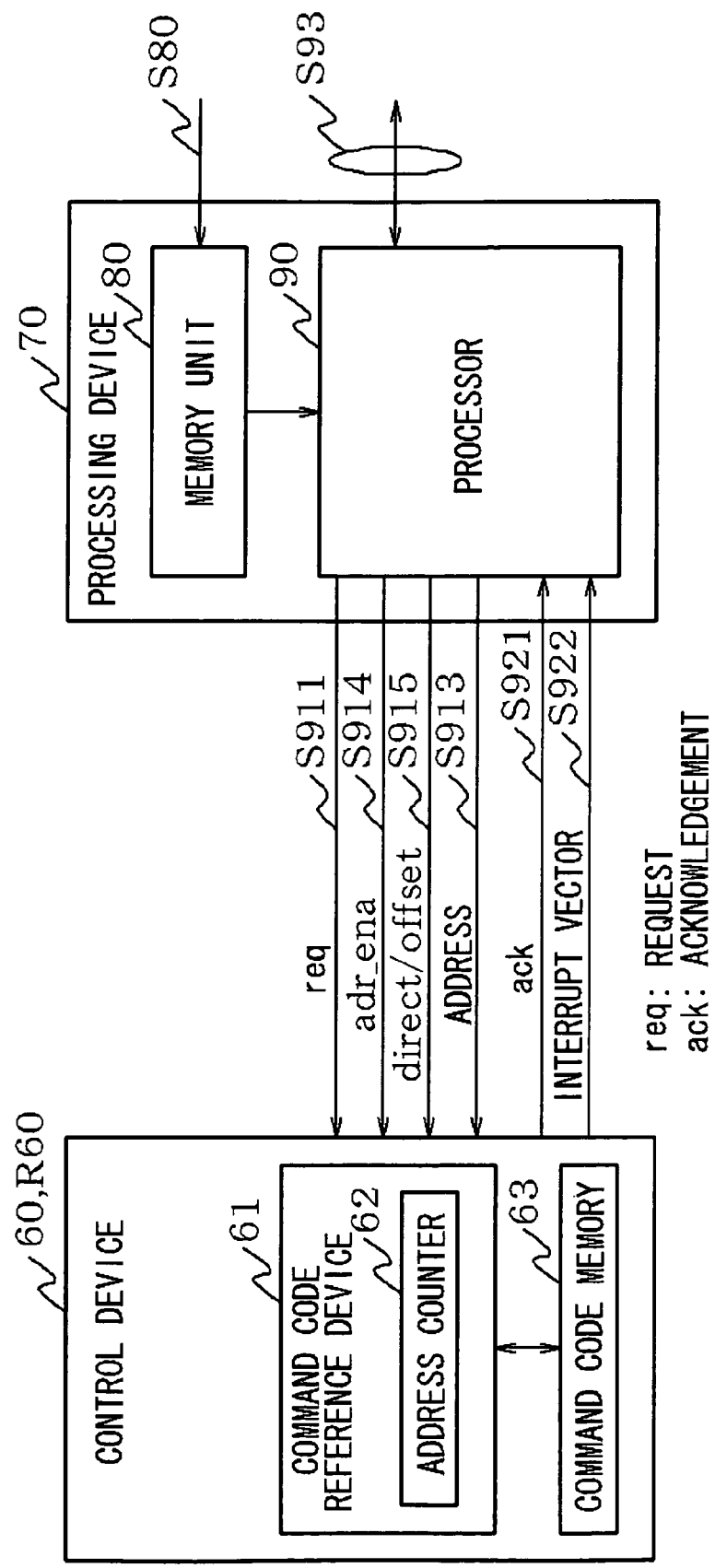
FIG. 11 is a diagram showing an example of how the control device and the processing element are connected in the embodiment of the present invention.

Another example of the protocol when the processing device 70 issues the command signal S91 to the control device 60 is shown in FIGS. 9 and 11. This protocol may be applied as a protocol between the interface device 40 and the control device 60.

FIG. 9 is a diagram showing a method in which the control device 60 comprises a command code reference device 61 and a command code memory 63, and the processing device 70 sends an address signal S913 along with the request signal S911. FIG. 10 shows an example of a command code stored in the command code memory 63. The address signal S913 specifies the address of the command code memory 63 where a command that one wants the control device 60 to execute is stored.

The control device 60 receives the address signal S913, refers to the command code memory 63 using the command code reference device 61, executes the command corresponding to the address signal S913, and then returns the acknowledgement signal S921 when the processing is ended.

The command code memory 63 may be any memory such as a memory external to the control device 60 which can be referred to by the control device 60 or the external memory device 10. Further, when there is a plurality of the processing devices 70, a plurality of the command code reference devices 61 may be provided within the control device 60 so that the commands are processed in parallel, or as many the command code reference devices 61 as the processing devices 70 may be provided.

The protocol shown in FIG. 9 requires the command code reference device 61 and the command code memory 63 in the control device 60, however, a fewer number of connection signal lines are required between the control device 60 and the processing device 70 compared with the protocol in FIG. 6 since the bit number of memory address can generally be fewer than the bit number of data.

FIG. 11 is a diagram showing a method in which the control device 60 comprises the command code reference device 61 and its address counter 62, and the processing device 70 controls the address counter 62 using the request signal S911 along with address operation signals S914 and S915 and sends addresses to the control device 60 using the address signal S913 when necessary. The command code reference device 61 and its address counter 62 may be provided for every processing device 70, to which they are connected.

When the adr_ena address counter operation signal S914 is effective and the direct/offset address counter operation signal S915 indicates "direct," the address signal S913 sent from the processing device 70 is stored in the address counter 62. When the adr_ena address counter operation signal S914 is effective and the address counter operation signal S915 indicates "offset," the value of the address signal S913 sent from the processing device 70 is added to the address counter 62. When the adr_ena address counter operation signal S914 is ineffective, the address signal S913 sent from the processing device 70 is ignored and the value of the address counter 62 is held.

When the control of the address counter 62 by the processing device 70 is complete, the control device 60 processes the command stored, referring to the command code memory 63 where the command is stored and using the value of the address counter 62 and the command code reference device 61, and returns the acknowledgement signal S921 after the processing is complete.

FIG. 12 is a diagram showing an example of a command code stored in the command code memory 63 in the structure shown in FIG. 11. As shown in FIG. 12, the command code memory 63 stores an address counter control code A20 and a flag A30 besides the command code A10, however, they may be excluded. When the format in FIG. 12 is employed, the control device 60 performs the processing specified by the address counter control code A20 after the processing written in the command code A10 is complete and before the acknowledgement signal S921 is returned to the processing device 70.

Figure 13:
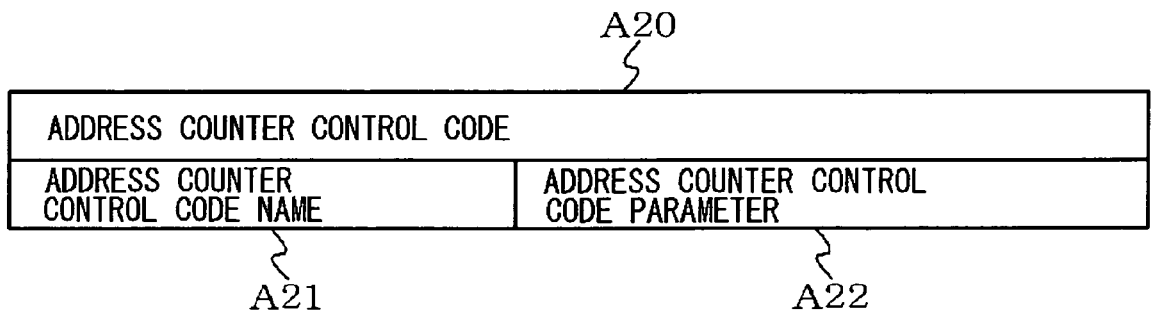
FIG. 13 is a diagram showing a structural example of an address counter control code of the embodiment of the present invention.

FIG. 13 shows the details of the address counter control code A20. The address counter control code A20 is made up of an address counter control code name A21 and an address counter control code parameter A22, its parameter. FIG. 14 shows examples of the address counter control code. "Load_adr" sets the value of the address counter control code parameter A22 as a new value of the address counter 62. "Add_adr" adds the value of the address counter control code parameter A22 and the value of the address counter 62. "Push_adr" does not show the current value of the address counter 62, but stores it in an address counter stack and sets the value of the address counter control code parameter A22 as a new value of the address counter 62. "Pop_adr" instruction takes out a value from the address counter stack and sets the value as a new value of the address counter 62. The address counter stack may be provided in the command code reference device 61.

Further, the flag A30 is used as a flag indicating whether or not the command reference and execution continues to be performed using a new value of the address counter 62 after the address counter control code A20 has been executed. Hereinafter, the flag indicating that the command execution continues is called "cont," and the one indicating that the execution is stopped is called "stop."

For instance, in the structure shown in FIG. 11, when the command code memory 63 stores a command sequence shown in FIG. 15, and the processing device 70 sets the address signal S913 to 100, makes the address counter operation signal S914 ineffective, and issues a command, the control device 60 executes command codes Y100, Y101, and Y200 in order.

Therefore, in a system where the command code reference device 61 has a built-in address counter 62 and the address counter 62 is controlled by the address counter control code A20, the processor 90 within the processing device 70 can generate the address signal S913 with low hardware resources since the processing device 70 has to output the address signal S913 only when necessary (when a command is issued).

As to the protocol between the processing device 70 and the control device 60, one may be selected from the ones shown in FIGS. 6, 9, and 14 or any combination of these may be used. Or a plurality of structures may be combined adding control lines as necessary so that it is possible to switch between protocols. For instance, a control line may be added so that it is possible to select between the protocol in FIG. 6 and the protocol in FIG. 11.

Figure 16:
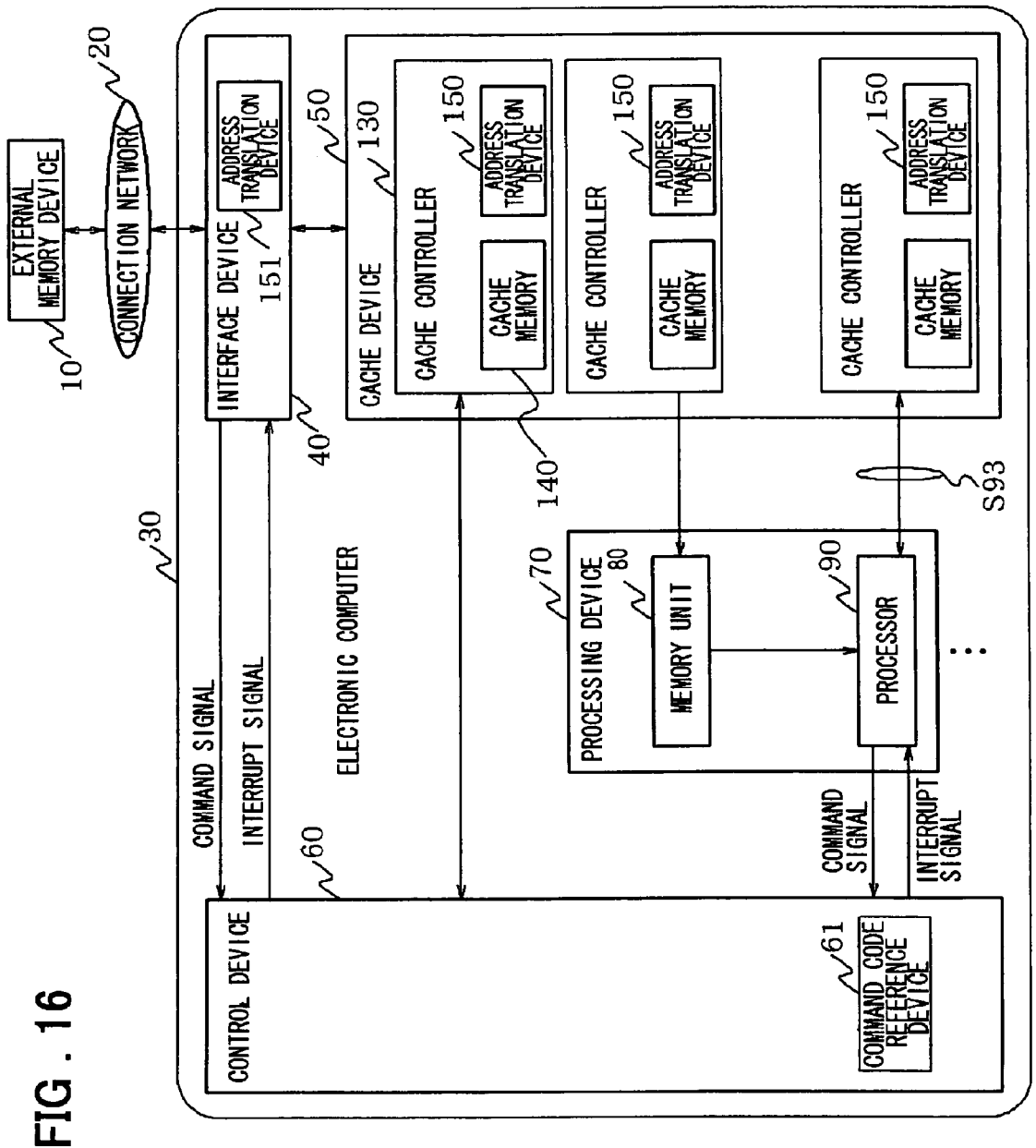
FIG. 16 is a block diagram showing a structure where a cache device of the embodiment of the present invention is added.

Next, in order to improve the speed of the data transfer between the electronic computer 30 and the outside, a cache device 50 including a cache controller 130 may be added to the electronic computer 30 of FIG. 1, controlling the cache controller 130 with commands as shown in FIG. 16. In FIG. 16, the cache device 50 has three cache controllers 130, which are respectively connected to the control device 60, the memory unit 80, and the processor 90, however, one single cache controller 130 may be connected to all of them. A plurality of ports of cache memories 140 may be provided in the cache controller 130. Further, an address translation device 150 may be shared among a plurality of cache controllers.

The cache controller 130 includes the cache memory 140 temporarily holding data that is stored for example in the external memory device 10 and that the processing device accesses and the address translation device 150. The cache controller 130 is controlled by commands, transfers primarily the data between the cache memory 140 and the external memory device 10 and the data between the cache memory 140 and the control device 60 or the processing device 70, and operates in parallel with the processing device 70 and the control device 60.

The address translation device 150 is a device that bilaterally translates addresses between the address space of the processing device 70 and the address space of the interface device 40 and is able to have an independent address space within the processing device 70. Further, it can also define an independent address space for every processing device 70 by providing an address translation device 150 for every processing device 70.

Further, the address translation device 151 provided in the interface device 40 performs address translation on the differential of the address space between the electronic computer 30 and the external memory device 10 and other devices connected to the electronic computer 30 via the connection network 20. The processing device 70 controls the address translation device 150 by having the control device 60 execute commands.

Commands for controlling the cache controller are not mentioned in FIG. 8, however, for instance, when the address translation device 150 comprises a translation buffer storing a pair of a translated address and translator address, commands that perform controls such as to register to the buffer, delete, and replace are needed, and also a command that sets a particular region within the cache memory 140 as a local memory region exclusively for the processing device 70 may be added.

Further, by analyzing the data flow, performing scheduling, and describing a cache that will be used and the control of this cache as a command sequence in advance, the processing by the processing device 70 and the control of the data flow by the control device 60 can be performed in parallel, improving the processing capacity of the processing device 70. In addition, since the processing device 70 issues a command only when necessary, excessive overhead does not occur.

For instance, it becomes possible to load data into the cache memory 140 in advance before each device accesses the cache memory 140 by controlling the cache controller 130 with commands, realizing more efficient data transfer. Further, from the above descriptions, it is apparent that, even if a plurality of the present electronic computers 30 are connected to the connection network 20, they will be able to communicate with and control each other and the present electronic computer 30 is freely expandable. In addition, the present electronic computer 30 may be realized as an LSI comprising at least one of the present electronic computer 30 or a part of the present electronic computer 30 may be realized as an LSI. Further, the present electronic computer 30 may be logically implemented in reconfigurable hardware such as an FPGA and a PLD.

Next, the operation of the electronic computer 30 of the embodiment of the present invention will be described with reference to the drawings. Although the various structures of the electronic computer 30 have been described, a structure shown in FIG. 17 will be used to explain the operation. First, a method for generating a program that divides an application program, the object processed by the electronic computer, into processing units stored in program data memories 811 to 813 and that generates the commands executed by the control device 60 will be explained, and then the operation and control method of the electronic computer 30 with the structure shown in FIG. 17 will be described.

Figure 17:
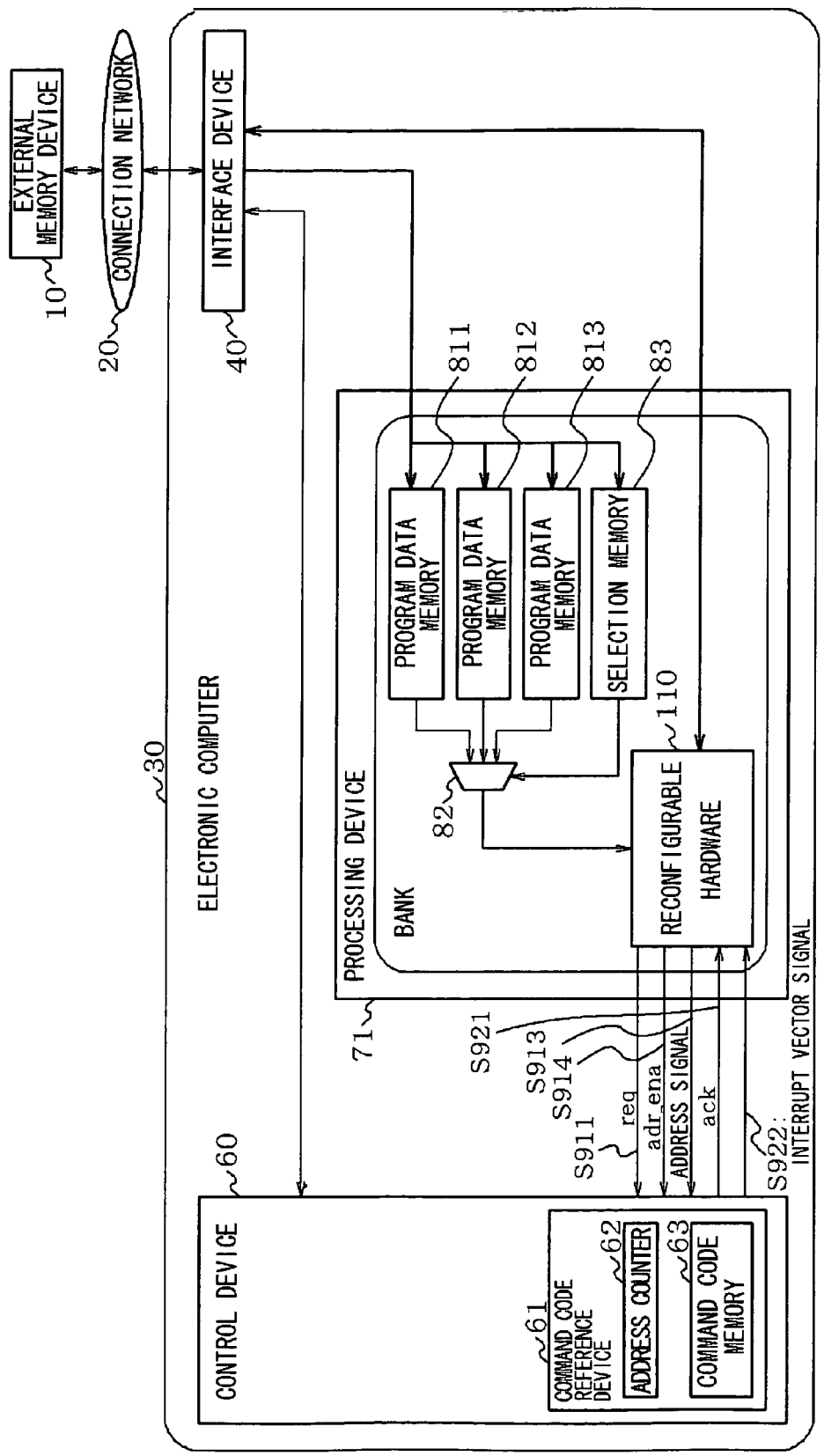
FIG. 17 is a block diagram showing a structural example referred to when an operational description of the embodiment of the present invention is made.

Referring to FIG. 17, a processing device 71 comprises one bank of a processing element 110 realized by reconfigurable hardware and connected to the three program data memories 811, 812, and 813 via the effective block selection 82, the control device 60 and the processing device 71 are connected by the protocol shown in FIG. 11 (minus the address counter operation signal S915 indicating "direct/offset"), and the command signal S41 and the interrupt signal S42 between the control device 60 and the interface device 40 are omitted. The command set implemented in the control device 60 in FIG. 17 is as shown in FIG. 8, and the address counter control code implemented in the control device 60 is as shown in FIGS. 13 and 14. Further, the cache device 50 is omitted.

Figure 18:
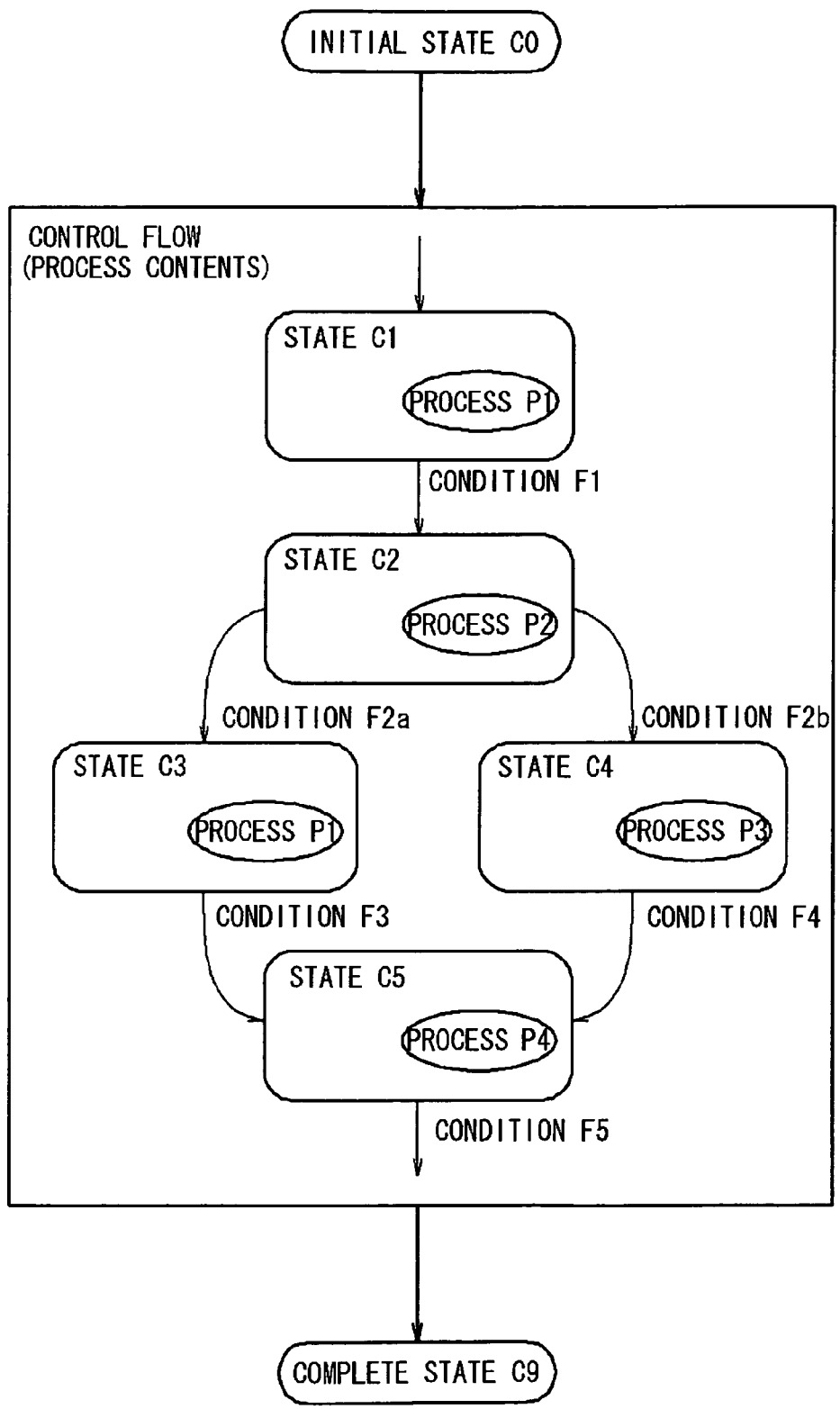
FIG. 18 is a diagram illustrating an application implemented in the embodiment of the present invention.

FIG. 18 is a control flowchart showing an example of the flow of the process content of the application executed by the processing element 110 shown in FIG. 17. As shown in FIG. 18, the application goes through an initial state C0, executes processes shown in the control flow while dynamically switching among them, and reaches a complete state C9 after all the processes are done. The initial state C0 is a state in which it is ready to start a process P1. The complete state C9 is a state in which all the functions of the processing device 71 in FIG. 17 come to a halt, for instance.

The processing content of the application in FIG. 18 has five states (C1, C2, C3, C4, and C5) and four kinds of process contents (P1, P2, P3, and P4), and the application moves from the initial state C0 to the state C1 unconditionally. In the state C1, it performs the process P1, and moves to the state 2 with a condition F1. In the state C2, it performs the process P2, and moves to the state 3 with a condition F2$a$ or to the state 4 with a condition F2$b$. In the state C3, it performs the process P1 and moves to the state 5 with a condition F3. In the state C4, it performs the process P3 and moves to the state 5 with a condition F4. In the state C5, it performs the process P4 and moves to the complete state C9 with a condition F5.

Figure 19:
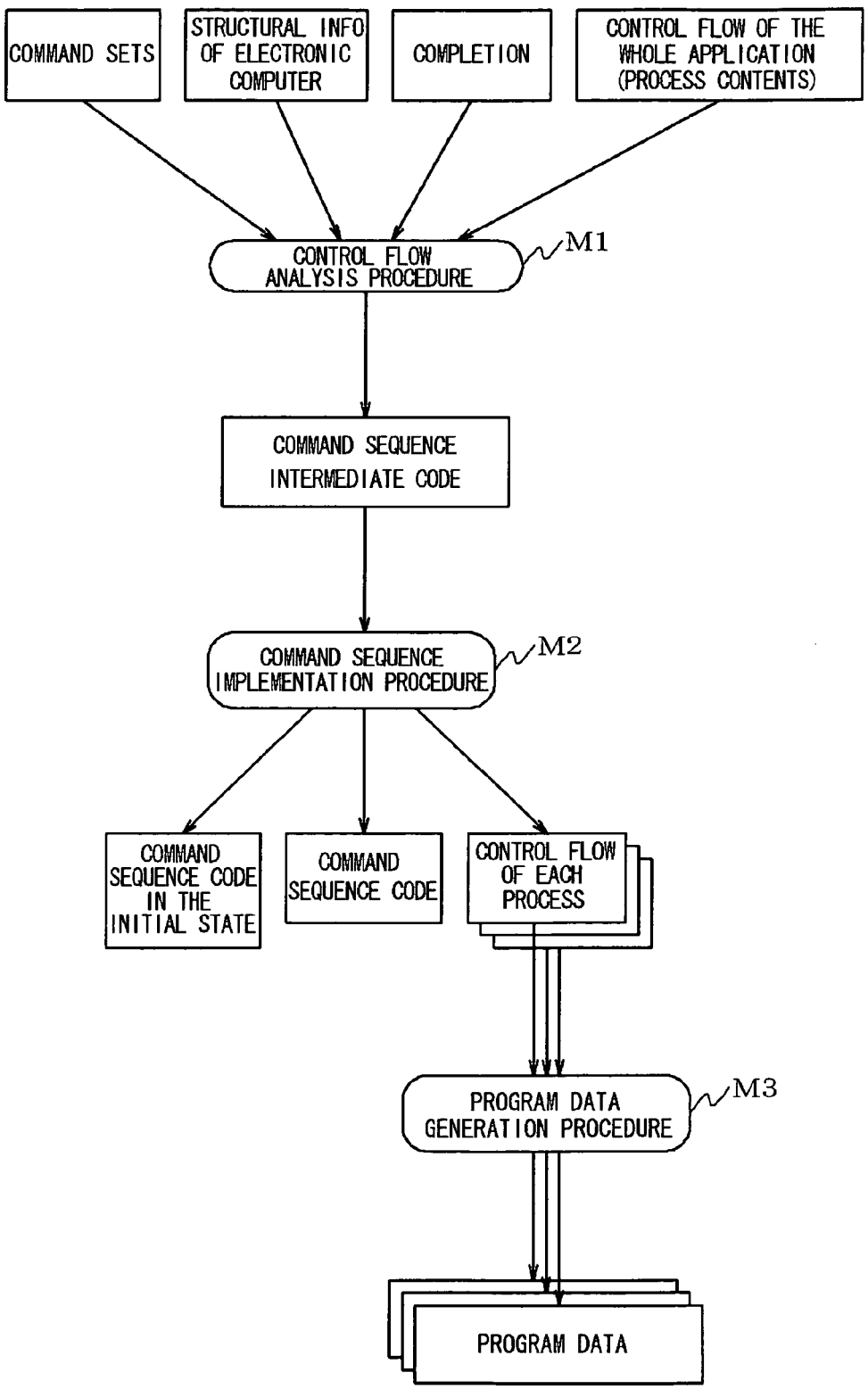
FIG. 19 is a generation flow chart of program data of the embodiment of the present invention.

FIG. 19 is a flowchart showing how the program executing the application is generated. The flow shown in FIG. 19 is made up of a control flow analysis procedure M1 generating a command sequence executed after each process, a command sequence implementation procedure M2 translating the command sequence into a data string, and a program data generation procedure M3 generating program data, and the control flow of the whole application, completion, the structural information of the electronic computer 30, and its command sets are inputted into the flow outputting a command sequence code indicating the initial state C0 of the present electronic computer, all the program data used within all the processing devices, and the command sequence code to which they refer. The control flow analysis procedure M1, the command sequence implementation procedure M2, and the program data generation procedure M3 are respectively realized by a program.

In the control flow analysis procedure M1, all the processes (P1 to P4), the state (C1 to C5) corresponding to each process, and the transition condition (F1 to F5) and target corresponding to each state are analyzed. And the intermediate code of a command sequence where it is possible to move to a next state by assigning each process to one of the program data memories 811 to 813, switching the effective block selection unit 82, and continuously executing each process is generated.

An example of the intermediate code of the command sequence resulted from the analysis of the application in the control flow analysis procedure M1 in FIG. 18 is shown in FIG. 20. Here, when the power is turned on, the effective block selection unit 82 selects the program data memory 811. In FIG. 20, 812, a parameter of a command "load_prg 812, PM1" of a command sequence SQ0 indicates that the program data generated to execute the process P1 in the processing element 110 is loaded into the program data memory 812, and PM1 indicates a region of the memory where this program data is stored. The program data PM1 specified by PM1 may be stored in any memory including the external memory device 10. At this point, the program data PM1 itself has not been generated, therefore it points to an empty region. Program data PM2, PM3, and PM4 respectively specify regions of the memory where program data generated to execute the process P2, the process P3, and the process P4 are stored.

In FIG. 20, for instance, the C4 is a state in which the process P3 is being executed, and when the condition F4 is met in this state, a command sequence SQ4 starts. The process content of the command sequence SQ4 does not start until the transfer of the program data PM4 to the program data memory 813 by "wait_prg 813, PM4" is complete and does start when the program data memory 813 is selected by "activate". When the program data memory 813 is activated, the processing element 110 starts the processing determined by the program held in the program data memory 813. At this point, since the program data executing the process PM4 is being held in the program data memory 813, the processing element 110 starts the process PM4. In other words, this means a move to the state C5.

As described, by adding execution procedures of the command sequence to the process content, it is possible to move to a next state. Furthermore, since the commands are issued at the same timing as when the processing device (the processing element) itself detects a predetermined condition, the timing of transition can be included in the process content, improving process efficiency. Further, in FIG. 20, since it is necessary to recognize whether the current state is C1 or C3 when the process P1 is being performed, before the program data memory that performs the process P1 is activated, an interrupt vector is set in the processing device 71 that performs the process P1, and transition conditions are revised to ones using its value. For instance, the setting of the interrupt vector of the state C1 is executed by "interrupt 71, C1" of the SQ0.

Figure 21:
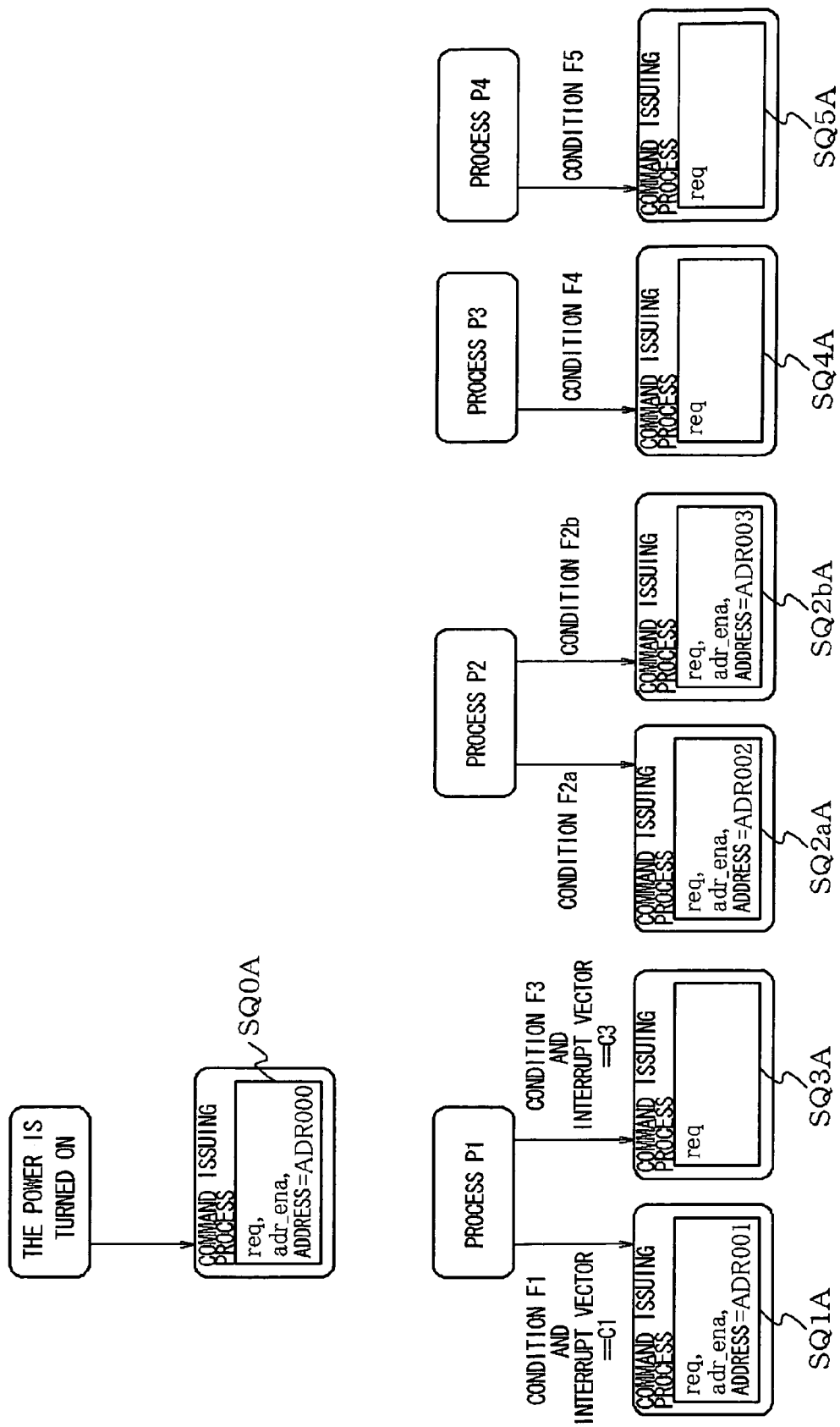
FIG. 21 is a control flow chart of the process of the embodiment of the present invention.

How the command sequences in FIG. 20 are assigned to memories in the command sequence implementation procedure M2 is shown in FIG. 22, and the control flow of each process translating the call of the command sequence in each process into the protocol of the interface between the control device 60 and the processing device 71 in the structure shown in FIG. 17 is shown in FIG. 21.

FIGS. 21 and 22 include a command sequence SQ0A executed first after the power is turned on. By executing the command sequence SQ0A, the application moves to the initial state C0. In the state C0, the program data memory 811 is selected by the effective block selection unit 82, therefore the processing element 110 starts the operation of the program stored in the program data memory 811 after the power is turned on.

As shown in FIG. 21, each process becomes a control flow where each command sequence issuing process is added to the state when the power is turned on and each of the original process (P1, P2, P3, and P4). For instance, in the process P2 in FIG. 21, a command issuing process SQ2$a$A is executed when the condition F2$a$ is met, and a command issuing process SQ2$b$A is executed when the condition F2$b$ is met. When the processing device 71 executes the command issuing process SQ2$a$A, the request signal S911, the adr_ena address counter operation signal S914, and the address signal S913 indicating ADR002 are outputted. As shown in FIG. 22, the address ADR002 specifies a command sequence SQ2$a$, therefore the control device 60 execute the content of the SQ2$a$.

Further, as shown in FIG. 20, since the operations of the command sequences SQ3 and SQ4 are identical, they can share one base address value, ADR004 as indicated in FIG. 22. In addition, as shown in FIG. 18, since the state C5 follows the state C3 or the state C4, "add_adr" is used as the address counter control code of the offset value+1 of the address ADR004 specifying the command sequences SQ3 and SQ4 instead of "load_adr" to set the next value of the address counter 62 (ADR004 offset+2) in FIG. 22. With such a design, the processing device 71 does not have to output extra addresses.

Figure 23:
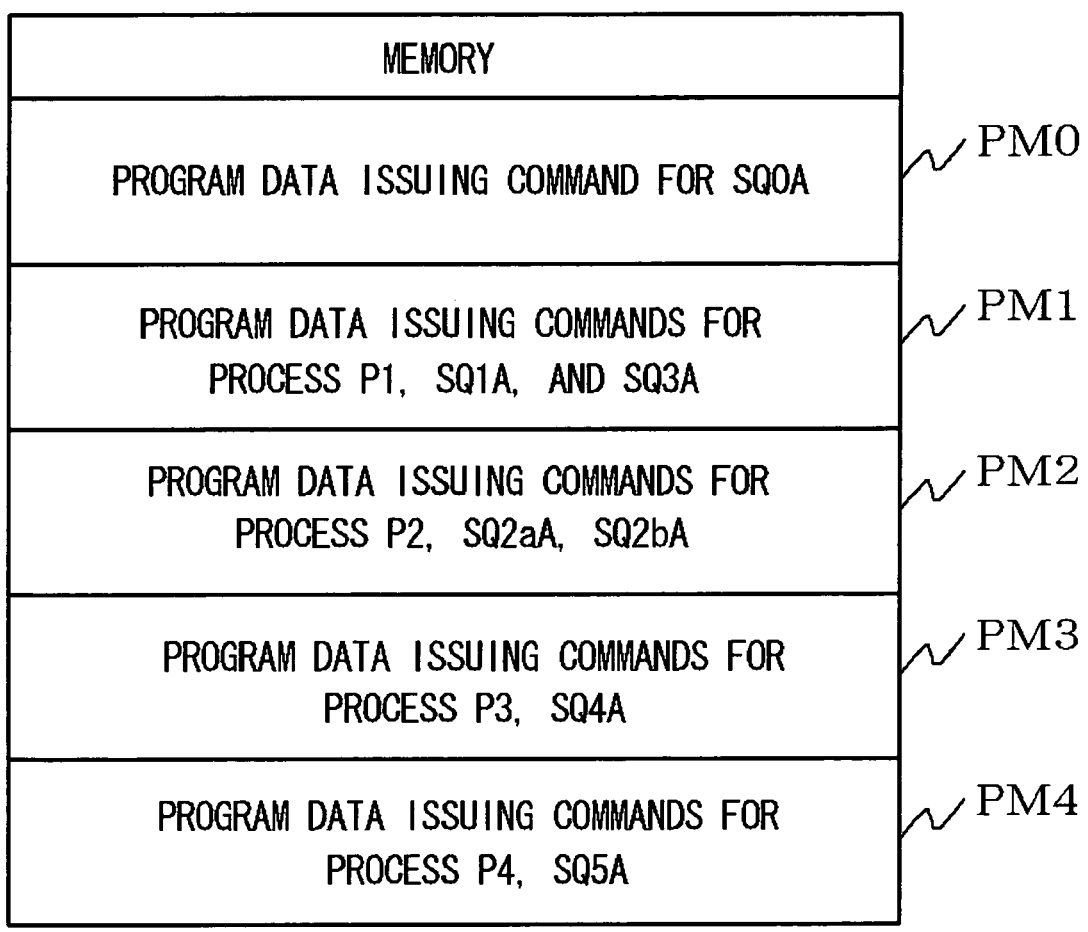
FIG. 23 is a diagram of the program data assigned to a memory of the embodiment of the present invention.

Finally, the program data executing each process shown in FIG. 21 is generated in the program data generation procedure M3. FIG. 23 shows an example where each program data generated is stored in a memory. The memory region where the generated program data PM1, PM2, PM3 and PM4 are stored is reflected in the parameter of each command sequence in FIG. 22.

Further, by having the electronic computer comprise the address translation device as shown in FIG. 16, the address specifying the memory where the memory addresses and commands that each process accesses are stored can be designed in an independent address space. Regarding program data PM0, since it needs to be executed right after power-on of the electronic computer with the structure shown in FIG. 17, this program data PM0 must be stored in the program data memory 811 in advance. Therefore, the initial state of the electronic computer at power-on in the present embodiment is as shown in the list of FIG. 24.

Figure 25:
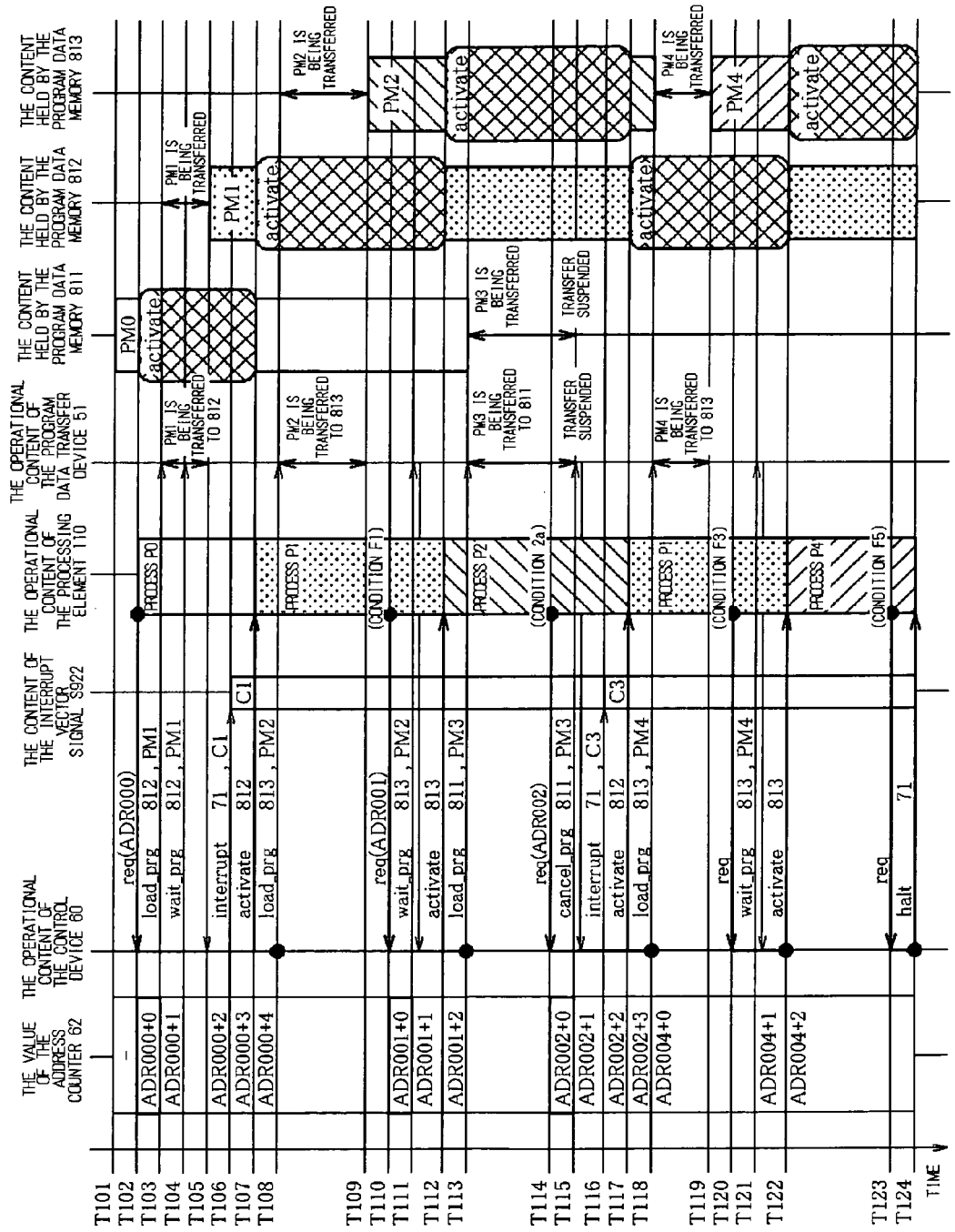
FIG. 25 is a timing chart illustrating the operation of the embodiment of the present invention.

Next, the operation and control method of the electronic computer 30 will be described. FIG. 25 is a timing chart illustrating the operations described above. Explanations will be made using FIGS. 25, 17, 18, 21, 22, 23, and 24.

The horizontal rows of FIG. 25 show the values of the address counter 62 in the control device 60, the operational contents of the control device 60, the operational contents of the processing element 110, the contents of the interrupt vector signal S922 inputted into the processing element 110, the contents of the program data respectively held by the program data memories 811, 812, and 813, and the status of the transfer of the program data, and the vertical column shows the lapse of time in descending order from T101. The parts shown in mesh in the columns of the program data memories 811, 812, and 813 indicate that they are being activated.

At the timing of T101, the electronic computer 30 is in the state when the power is turned on as shown in FIG. 24, and the program data PM0 that performs the command issuing process SQ0A is stored in the program data memory 811.

At T102, the processing element 110 starts the operation of the PM0 and executes the command issuing process SQ0A. The command reference device 61 of the control device 60 sets the address counter 62 to the address value ADR000 when it receives the command issuing process SQ0A, and reads the commands stored at ADR000 of the command code memory 63 where the command sequences of FIG. 22 are stored, and executes "load_prg" at T103. At T103, the control device 60 executes "load_prg" and starts transferring the program data PM1 to the program data memory 812. The information as to where the program data PM1 is stored is included in PM1, a parameter of "load_prg," and here it is assumed that it is stored in the external memory device 10 as shown in FIG. 23, however, it may be stored in any memory other than the external memory device 10.

Referring to FIG. 22, since the address counter control code at ADR000 is set so as to execute a next command, the control device 60 adds one to the address counter 62 and executes the next instruction at T104. At T104, the control device 60 waits the program data PM1 to be transferred to the program data memory 812 completely, and when the transfer is ended at T105, the control device 60 continues to execute the next instruction at T106.

Executions continue similarly, and when the control device 60 executes "activate 812" at T107, the selection memory 83 is updated to the information that selects the program data memory 812, the effective block selection unit 82 switches to the program data memory 812 following the instruction of the selection memory 83, and the processing element 110 switches its operation to start processing PM1 stored in the program data memory 812. At T108, the control device 60 ends processing a series of the command sequence started at T102 with the address counter control code "add_adr 0/stop."

Executions continue similarly, and at T110 when the processing element 110 detects the condition F1 while executing the process P1 and confirms that the interrupt vector signal S922 is in C1, it executes a command issuing process SQ1A. Receiving the command issuing process SQ1A at T110, the control device 60 updates the value of the address counter 62 to the value ADR001.

At T112, the control device 60 reads the command code memory 63, executes "activate 813," and switches the process content of the processing element 110 to a processing PM2 stored in the program data memory 813.

Executions continue similarly, and at T123 when the processing element 110 detects the condition F5 while executing the process P4, it executes a command issuing process SQ5A. The control device 60, which has received the command issuing process SQ5A at T123, refers to the command code memory 63, and executes "halt" to the processing device 71 at 124. Receiving the instruction "halt," the processing device 71 halts operating and the control device 60 that has executed "halt" ends interpreting and executing the command sequence.

As described, five pieces of program data PM0, PM1, PM2, PM3, and PM4 are generated, however, only three program data memories 811, 812, 813 are used. This fact indicates that an application beyond the hardware resources can be implemented in the present electronic computer 30.

The processing device 71 comprises only one bank in FIG. 17, however, when it comprises two or more banks, the program data PM0 to PM4 may be stored in the program data memories of multiple banks and executed by the processing elements made up of respective reconfigurable hardware. In this case, an output of the processing device becomes a command and output data of the processing element selected by the effective bank selection unit 92, the processing element selected by the effective bank selection unit 92 operates effectively, and processing is proceeded while switching between the program data memories and the processing elements.

Figure 26:
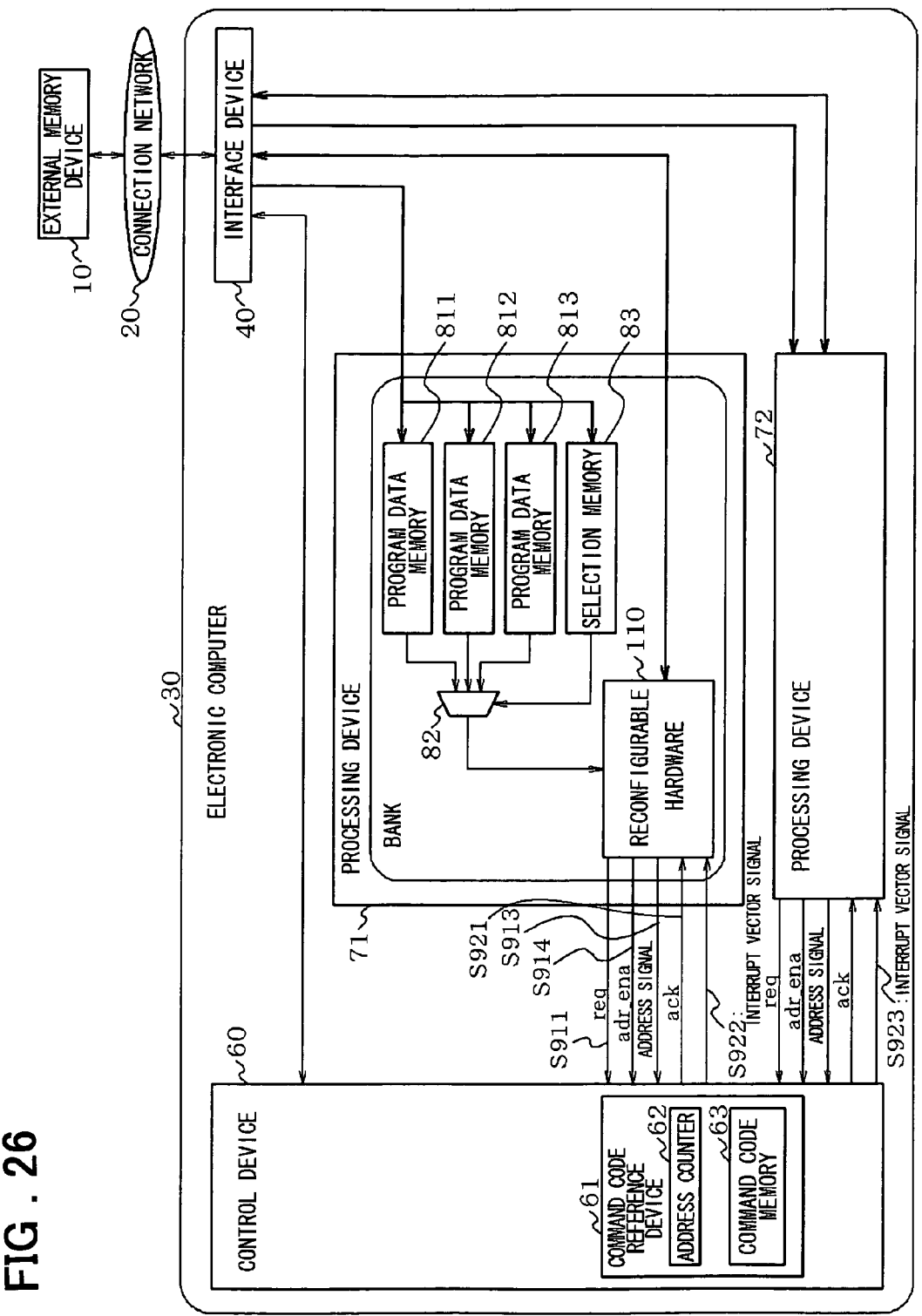
FIG. 26 is a block diagram illustrating a structure where two processing devices of the embodiment of the present invention are used.

Next, the operation when there is a plurality of the processing devices 70 will be described with a structure in FIG. 26 as an example. In FIG. 26, a processing device 72 is added to the structure shown in FIG. 17 where there is one processing device 71, resulting in the structure with two processing devices 70. Further, the processing device 72 executes issuing of the command SQ0A, which triggers the operation, instead of the processing device 71. Further, the command sequence SQ5 of the processing device 71 shown in FIG. 22 is changed to a command sequence SQ5B shown in FIG. 27, adding the execution of "interrupt 72, END71" after "halt," therefore the fact that the processing device 71 ends its operation is notified by interrupting the processing device 72.

Figure 28:
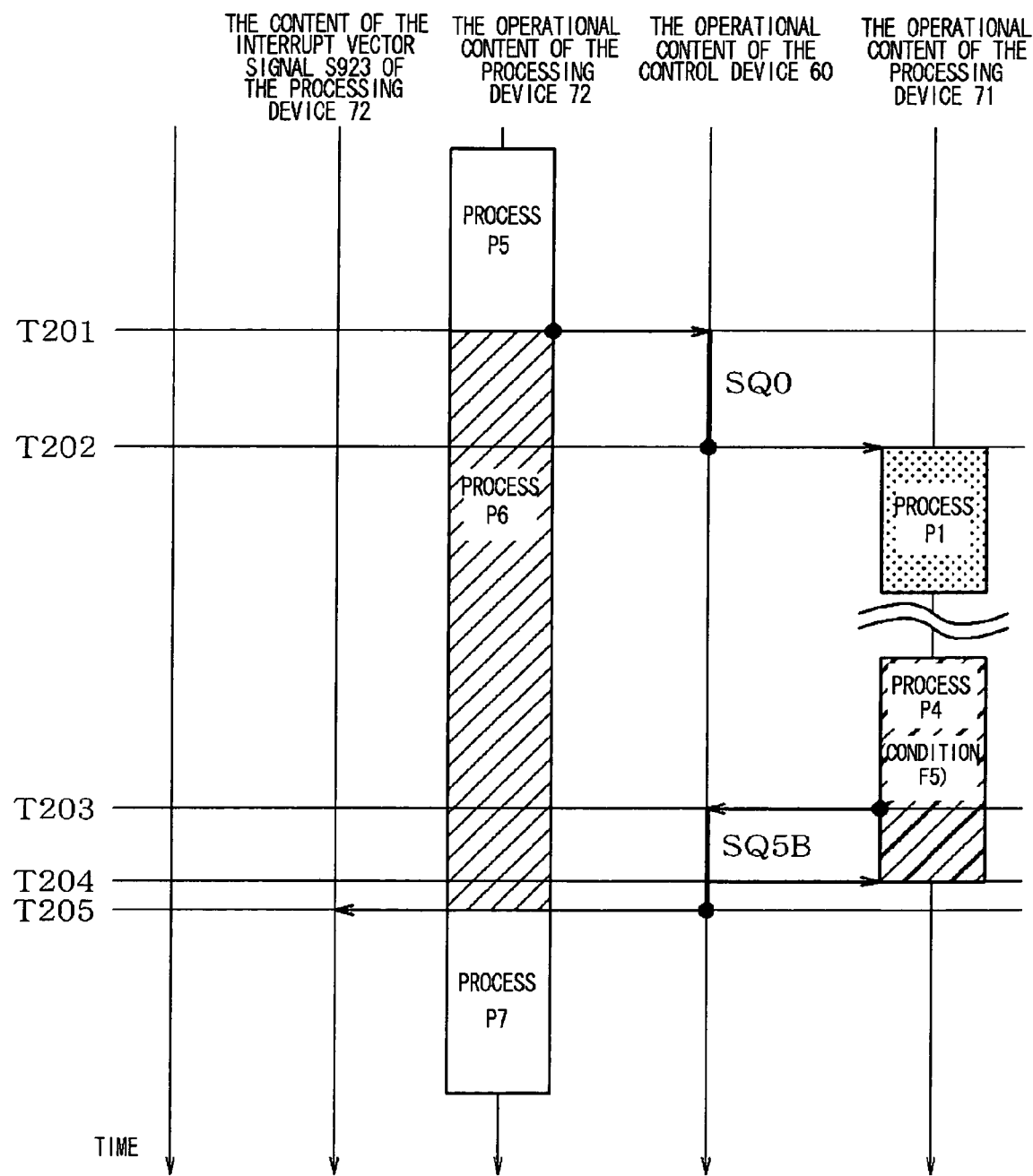
FIG. 28 is a timing chart illustrating how two processing devices of the embodiment of the present invention operate.

FIG. 28 is a timing chart illustrating the above-described operation where the processing device 72 executes the issuing of the command SQ0A and the processing device 71 notifies that it ends its operation to the processing device 72 with "interrupt."

Referring to FIG. 28, at T201, the processing device 72 executes the command issuing process SQ0A for initializing the processing device 71 during the process P5. Receiving the command issuing process SQ0A at T201, the control device 60 executes the command sequence SQ0. The processing device 71, which has been initialized at T202, performs a series of the operation shown in FIG. 25 and executes the command issuing process SQ5A at T203. At T203, the control device 60 executes the command sequence SQ5B, halts the processing device 71 by executing "halt" at T204, and outputs the interrupt to the processing device 72 by executing "interrupt" at T205.

After executing the command issuing process SQ0A at T201 while executing the process P5, the processing device 72 can instantly execute another process P6. And it waits for an interrupt from the processing device 71 during the process P6 and can move to the following process P7. The processing device 72 may simply wait for the interrupt from the processing device 71 without executing the process P6.

Further, in the structure in FIG. 26, the end state after "halt" is executed for the processing device 71 can become an initial state of the processing device 71, and the same process can be executed numerous times from the processing device 72. In addition, the processing element 72 can be structured as shown in FIGS. 2, 3, 4 and 5, and especially when the CPU 120 is a constituent element of the processing element 72, the processing element 71 may be used as a function call or system call within its software program or a thread and object including these, or an extension of the instruction of the CPU 120.

As described, since the processing devices are synchronized utilizing the "interrupt" command when a plurality of the processing devices operate in parallel, the context of the whole process can be executed in order while improving the processing capacity.

Further, since the electronic computer 30 can receive commands from the outside via the connection network 20 as shown in FIG. 1, the command issuing process SQ0A may be executed externally from the electronic computer 30. Also, since the processing element of the processing device 70 can be realized with the electronic computer 30 as shown in FIG. 5, the processes may be hierarchized and subdivided when being implemented.

Figure 29:
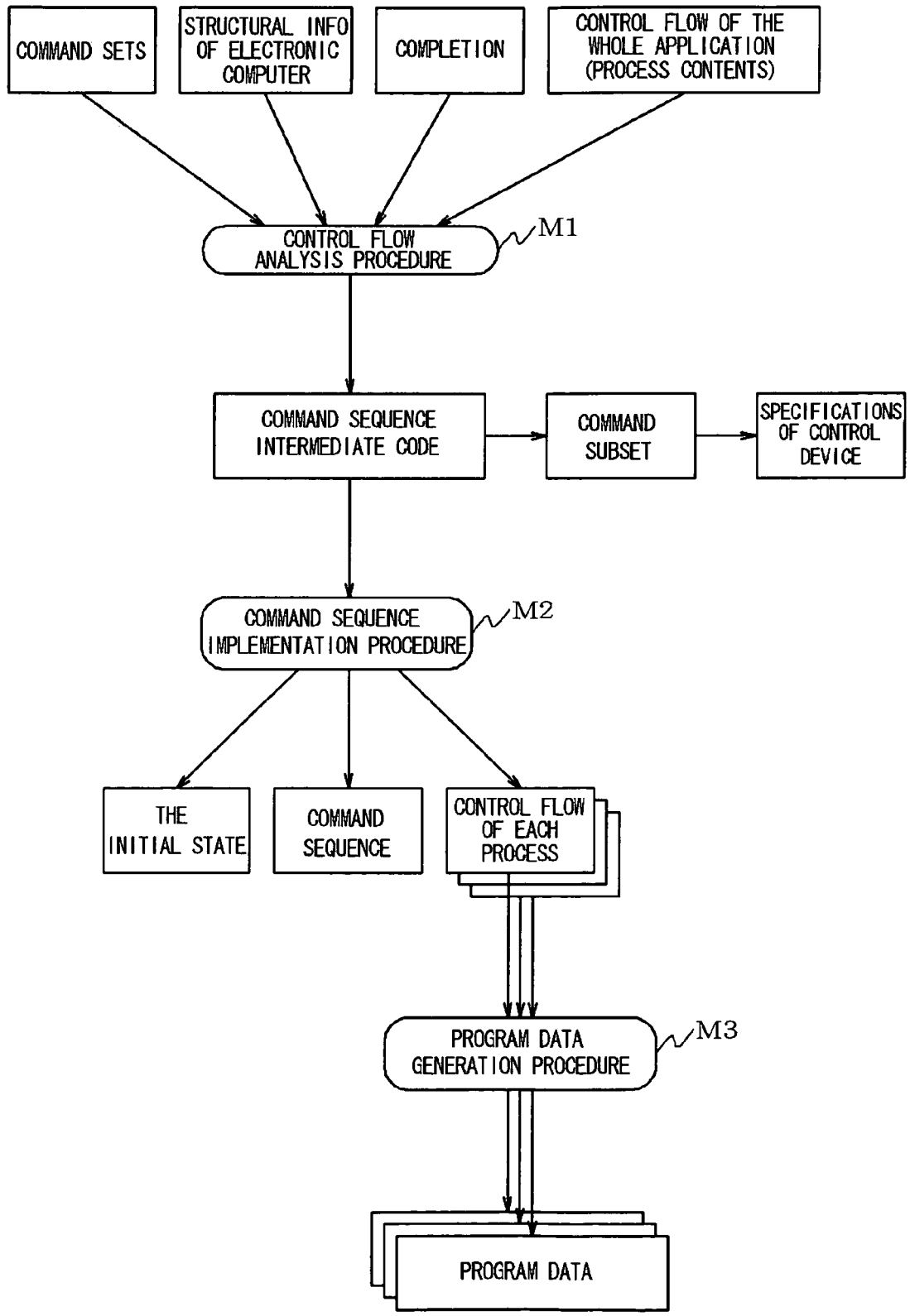
FIG. 29 is a generation flow chart of the program data of the embodiment of the present invention.
Figure 30:
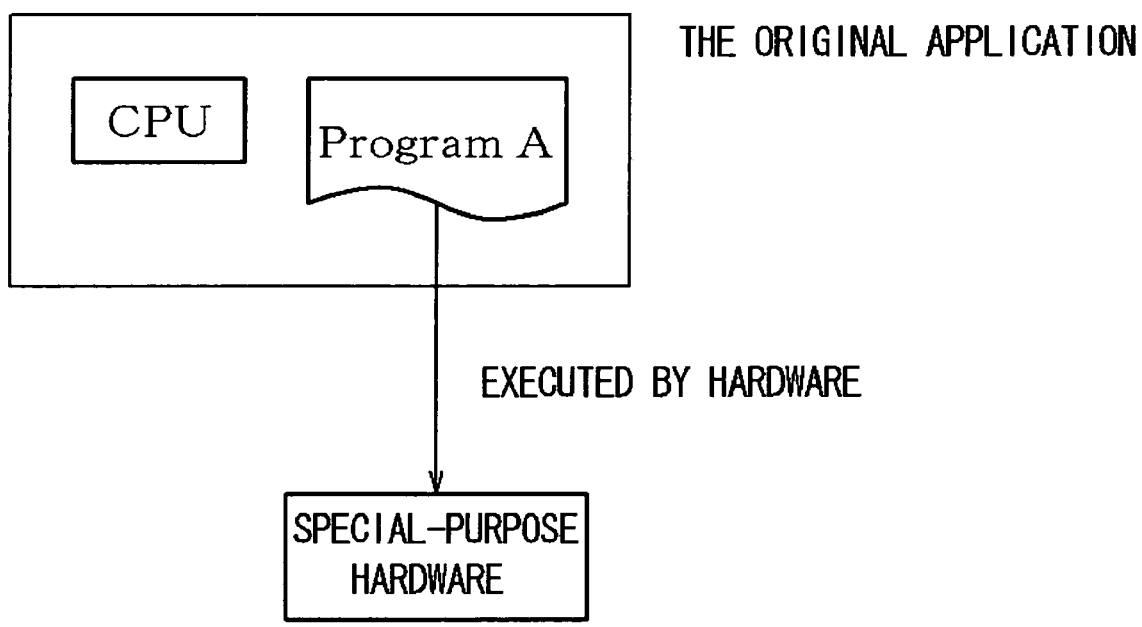
FIG. 30 is a diagram illustrating a technique in which the whole application program is implemented in special purpose hardware in the conventional technology.
Figure 31:
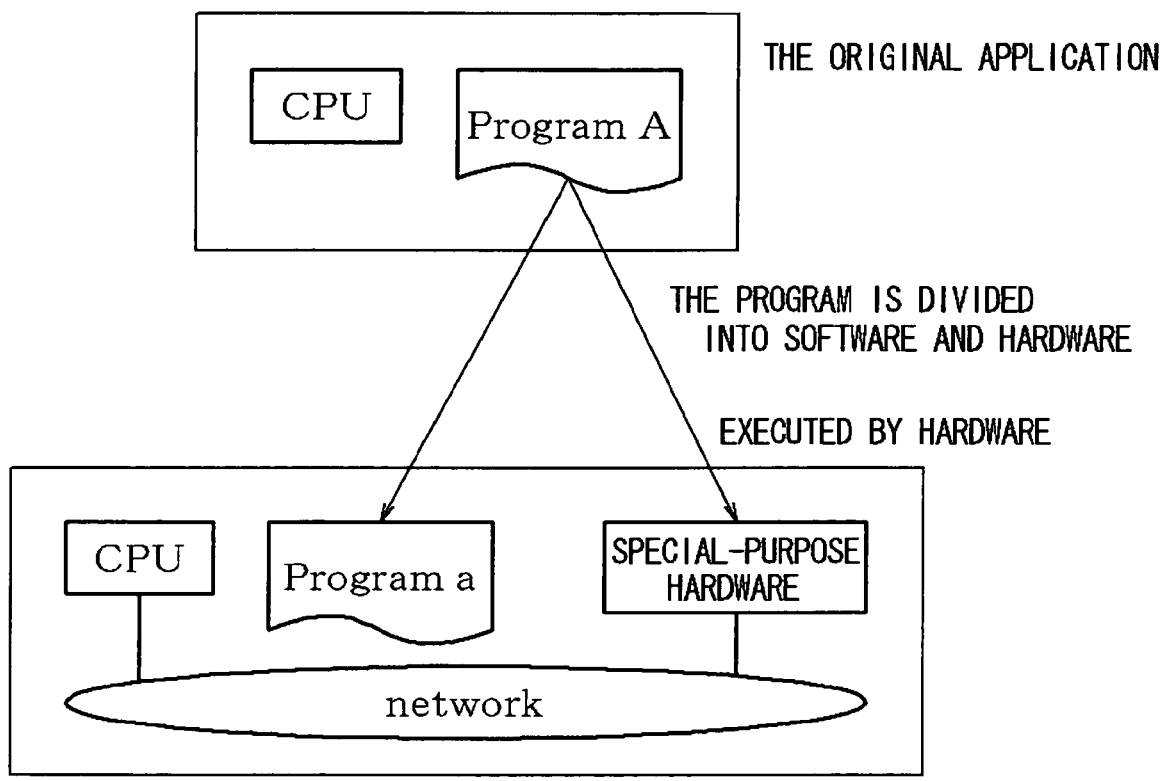
FIG. 31 is a diagram illustrating a technique in which part of application program is implemented in special purpose hardware in the conventional technology.
Figure 32:
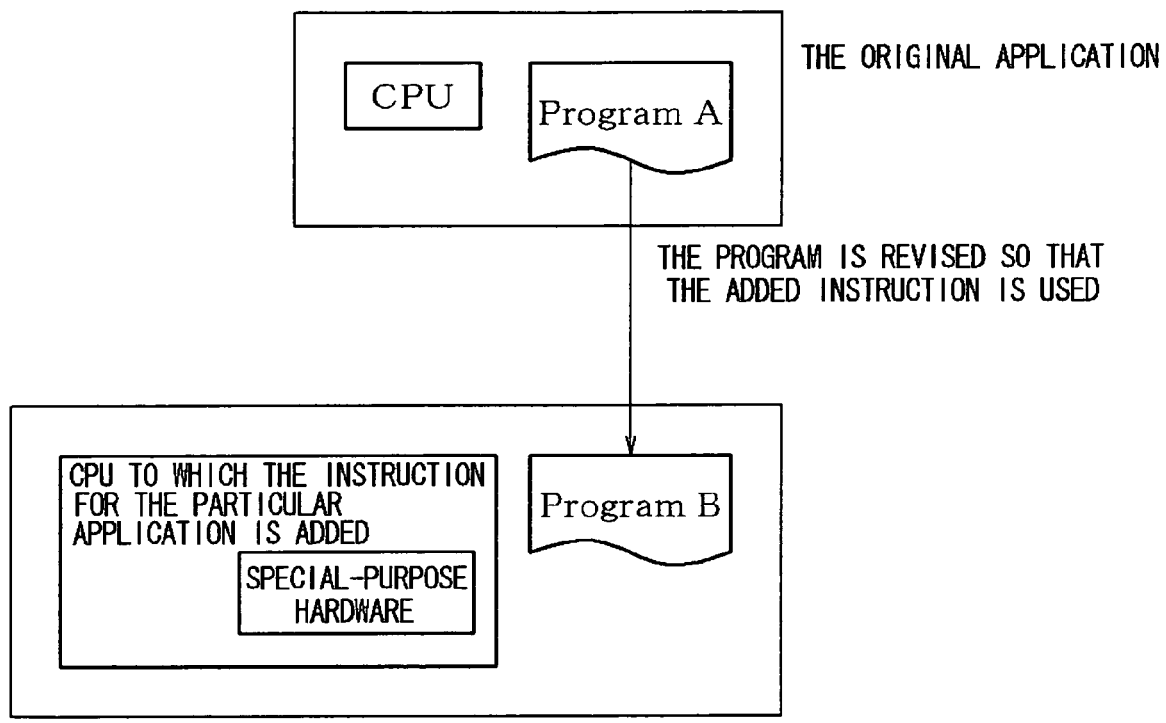
FIG. 32 is a diagram illustrating a technique in which part of application program is implemented in special purpose hardware in the conventional technology.

In the above description of the operation, an embodiment where the structure of the present electronic computer is fixed is shown, however, for instance, when the control device 60 is the reconfigurable control device 60 as shown in FIG. 5, only commands used in the command sequence intermediate code are used as a command set in the generation flow such as the one shown in FIG. 29, and the control device 60 in which only the command subset of the command set is implemented may be employed. By having such a structure, the control device 60 can be simplified.

The cache device 50 shown in FIG. 16 was omitted in the above description, however, it is evident that the cache device 50 can be inserted in the structures shown in FIGS. 17 and 26, the data transfer time between the electronic computer 30 and the outside can be shortened by inserting the cache device 50, and it becomes possible to have the processing device have its own address space by having the address translation device 150.

Further, all the constituent elements including the control device 60 and the processing device 70 may be newly designed and manufactured based on the analytical results by the implementation flow.

It is to be understood that the present invention is not limited to the above-described embodiments and each embodiment can be suitably modified within the scope of the technological idea of the present invention.

INDUSTRIAL APPLICABILITY

As described above, according to the present invention, since even a large application program can be executed by small reconfigurable hardware by dividing the process of the application program into a plurality of processing units executed by the reconfigurable hardware while switching between programs creating a logic circuit for every processing unit, the application program can be executed at high speed and low cost, and further, since the program of the processing unit can be easily applied by changing the command sequence of the processing unit, the application of a new application program and the creation of a new electronic computer can be realized at low cost.

Further, by having a plurality of the program data memories holding the programs creating the logic circuits and reading the program of the next processing unit into another program data memory during the execution of a processing unit, the read time of the programs when being switched can be shortened, resulting in a shorter switching time and the improvement of the processing speed.

The invention claimed is:

1. A system comprising a dividing device that executes a dividing program, wherein the dividing program divides an application program into a plurality of processing units and generates program data and command code sequences executed by an electronic computer, said system comprising:

said electronic computer, comprising:

a processing device and a control device;

said processing device including reconfigurable hardware for each of said processing units, wherein said processing device comprises:

a processing element with reconfigurable hardware, a plurality of program data memories, each holding a program that creates a logic circuit directly in said reconfigurable hardware for each of said processing units, an effective block selection unit that connects one of said program data memories to said processing element;

wherein said control device executes a command specified by the processing device, wherein said command is instructed to be executed when the processing device detects a predetermined condition and said command switches which program is input to said processing element logically creating the reconfigurable hardware;

wherein said program is generated with a control flow of the application program, completion data, structural information of the electronic computer and a plurality of command sets of the electronic computer as inputs;

wherein said dividing program executes a control flow analysis procedure that divides the application program into a plurality of said processing units and generates a command sequence intermediate code; and wherein said dividing program executes a command sequence implementation procedure for translating said command sequence intermediate code into a data string that can be executed by the control device, wherein said control device interprets and executes:
an activate command selecting one of said program data memories and activating said processing element to start processing a program held in the selected program data memory;
a halt command halting operation of said processing device;
a load_prg command transferring program data from a specified memory device to one of said program data memories, wherein a parameter of the load_prg command indicates a region of one of said program data memories where the program data is stored;
a cancel_prg command canceling a load_prg operation, and
a wait_prg command waiting until completion of the load_prg operation.

2. The system as defined in claim 1, wherein the electronic computer comprises a command code memory, holding commands that said control device executes, wherein said control device comprises a command code reference device reading commands from the command code memory according to an address specified by said processing device, interpreting, and executing the commands.

3. The system as defined in claim 2, wherein said command code reference device comprises an address counter holding the address of said command code memory, and in the exchange of commands between said processing device and said control device, a first address control line indicating that an address signal line outputted by said processing device is effective, and a second address counter control line instructing whether the value of the address signal line is stored in the address counter as it is or the result of adding the value of the address signal line to the value of the address counter is stored in the address counter when the first control line is effective.

4. The system as defined in claim 3, wherein said commands are stored in said command code memory in a format comprising a command code that classifies the commands, an address counter control code, and a flag that indicates whether or not the following command is executed, and said address counter control code includes a load_adr command setting the value of the address counter and a add_adr command adding a specified value to the address counter.

5. The system as defined in claim 4, wherein said address counter control code includes a push_adr command that hides the value of the address counter in an address counter stack provided in said control device and that sets a new value to the address counter, and a pop_adr command that returns the value of the address counter stack to the address counter.

6. The system as defined in claim 1, wherein the electronic computer comprises a cache device including a cache memory that temporarily holds data to be transferred to said processing device and a cache controller that controls the cache memory wherein the cache controller is controlled by a command issued by said processing device.

7. The system as defined in claim 6, wherein said cache device comprises an address translation device that translates an address defined externally to said processing device into an address defined inside of the processing device, and the address translation device is controlled by a command issued by said processing device.

8. A system comprising:
a dividing device that divides an application program into a plurality of processing units;
a processing device including reconfigurable hardware that creates a logic circuit for each said processing unit by executing a respective program, wherein said program is generated, given a control flow of the application program, completion data, structural information of the electronic computer and a plurality of command sets of the electronic computer as inputs, by executing a control flow analysis procedure that generates a command sequence,
wherein the dividing device executes a command sequence implementation procedure that translates said command sequence into a data string, and executes a program data generation procedure that generates program data; and
a control device that executes a command specified by the processing device;
wherein said command is instructed to be executed when the processing device detects a predetermined condition and wherein the command switches which program is input to said reconfigurable hardware logically creating the reconfigurable hardware; and
said processing device comprises a second reconfigurable hardware that creates a logic circuit by executing a program and a second control device that executes a command specified by the second reconfigurable hardware,
wherein said first and second control device interprets and executes:
an activate command selecting one of multiple program data memories and activating said reconfigurable hardware to start processing a program held in the selected program data memory;
a halt command halting operation of said processing device;
a load_prg command transferring program data from a specified memory device to one of said program data memories, wherein a parameter of the load_prg command indicates a region of one of said program data memories where the program data is stored;
a cancel_prg command canceling a load_prg command, and
a wait_prg command waiting until completion of the load_prg command.

9. The system as defined in claim 1, wherein the electronic computer is implemented on a semiconductor integrated circuit.

10. A control method in a system for switching and executing programs generated by dividing an application program into a plurality of processing units, wherein said system comprises an electronic computer that includes a control device and a processing device with reconfigurable hardware that creates a logic circuit for each of said processing units, said control method comprising:
issuing a command to the control device by the processing device when the processing device detects a predetermined condition,
generating a program, given a control flow of the application program, completion data, structural information of the electronic computer and a plurality of command sets of the electronic computer as inputs, by executing a control flow analysis procedure that generates a command sequence, wherein the command sequence is executed by said control device,
executing a command sequence implementation procedure that translates said command sequence into a data string,
executing a program data generation procedure that generates program data;
switching said programs that logically create reconfigurable hardware by said control device that has executed the command from the processing device;

interpreting and executing:
an activate command selecting one of multiple program data memories and activating said processing device to start processing a program held in the selected program data memories;
a halt command halting operation of said processing device;
a load_prg command transferring program data from a specified memory device to one of said program data memories, wherein a parameter of the load_prg command indicates a region of one of said program data memories where the program data is stored;
a cancel_prg command canceling a load_prg command, and
a wait_prg command waiting until completion of the load_prg command.

11. The control method as defined in claim 10, wherein, after said switching, while a program in a predetermined program data memory is being executed, a next program is read into another program data memory.

12. A control method, in a system for switching and executing programs generated by dividing an application program into a plurality of processing units, wherein said system comprises an electronic computer that includes a control device and a processing device with reconfigurable hardware that creates a logic circuit for each of said processing units, said control method comprising:
issuing a command to the control device by the processing device when the processing device detects a predetermined condition, said processing device including reconfigurable hardware and a plurality of program data memories that hold programs for each said processing unit, wherein said programs are generated, given a control flow of the application program, completion data, structural information of the electronic computer and a plurality of command sets of the electronic computer as inputs, by executing a control flow analysis procedure that generates a command sequence, wherein the command sequence is executed by said control device,
executing a command sequence implementation procedure that translates said command sequence into a data string, and
executing a program data generation procedure that generates program data,
creating logic circuits of the reconfigurable hardware, wherein an effective block selection unit selects one program data memory from the plurality of program data memories and makes it effective;
executing, by said control device that has received the command from the processing device, an activate command controlling the effective block selection unit so as to make a specified program data memory effective and connecting it to the reconfigurable hardware;
switching the content of a logic circuit in the reconfigurable hardware;
interpreting and executing:
an activate command selecting one of said program data memories and activating said processing element to start processing a program held in one of the selected program data memories;
a halt command halting operation of said processing device;
a load_prg command transferring program data from a specified memory device to one of said program data memories, wherein a parameter of the load_prg command indicates a region of one of said program data memories where the program data is stored;
a cancel_prg command canceling a load_prg command, and
a wait_prg command waiting until completion of the load_prg command.

13. The control method as defined in claim 12, wherein said control device executes:
an interrupt command issuing an interrupt vector from said control device to said specified processing device.

14. A program generation method for an electronic computer executing an application program divided into a plurality of processing units, wherein said electronic computer includes a control device and a processing device with reconfigurable hardware that can create a logic circuit for each of said processing units, comprising:
analyzing a control flow of the application program;
implementing a command sequence procedure in which a command sequence is generated by translating a command sequence intermediate code into a form that can be executed by the electronic computer; and
generating program data in which operational content of a processing unit is translated into a form that can be executed by the electronic computer,
wherein the application program is divided so that multiple program data memories hold a program creating a logic circuit for each processing unit in said reconfigurable hardware when the control flow of the application program is analyzed and divided into processing units during said analyzing a control flow step;
wherein the control device interprets and executes:
an activate command selecting one of said program data memories and activating said processing element to start processing a program held in one of the selected program data memories;
a halt command halting operation of said processing device;
a load_prg command transferring program data from a specified memory device to one of said program data memories, wherein a parameter of the load_prg command indicates a region of one of said program data memories where the program data is stored;
a cancel_prg command canceling a load_prg command, and
a wait_prg command waiting until completion of the load_prg command.

15. A computer program product for switching and executing programs on an electronic computer, the programs generated by dividing an application program into a plurality of processing units, wherein said electronic computer includes a control device and a processing device with reconfigurable hardware that can create a logic circuit for each of said processing units, the computer program product embodied in a computer readable medium, which when executed, causes a computer system to perform the steps of:
issuing a command to the control device by the processing device when the processing device detects a predetermined condition,
generating a program, given a control flow of the application program, completion data, structural information of the electronic computer and a plurality of command sets of the electronic computer as inputs, by executing a control flow analysis procedure that generates a command sequence, wherein the command sequence is executed by said control device,
executing a command sequence implementation procedure that translates said command sequence into a data string, and executing a program data generation procedure that generates program data executed by the processing device;

switching said program that logically creates reconfigurable hardware by said control device that has executed the command from the processing device;

interpreting and executing:

an activate command selecting one of multiple program data memories and activating said processing device to start processing a program held in the selected program data memory;

a halt command halting operation of said processing device;

a load_prg command transferring program data from a specified memory device to one of said program data memories, wherein a parameter of the load_prg command indicates a region of one of said program data memories where the program data is stored;

a cancel_prg command canceling a load_prg command, and a wait_prg command waiting until completion of the load_prg command.

16. A computer program product, for switching and executing programs on an electronic computer, the programs generated by dividing an application program into a plurality of processing units, wherein said electronic computer includes a control device and a processing device with reconfigurable hardware that can create a logic circuit for each of said processing units, the computer program product embodied in a computer readable medium, which when executed causes a computer system to perform the steps of:

issuing a command to the control device by the processing device when the processing device detects a predetermined condition, said processing device including a plurality of program data memories that hold programs for each said processing unit, wherein said programs are generated, given a control flow of the application program, completion data, structural information of an electronic computer and a plurality of command sets of the electronic computer as inputs, by executing a control flow analysis procedure that generates a command sequence, executing a command sequence implementation procedure that translates said command sequence into a data string, and executing a program data generation procedure that generates program data using the processing device, creating logic circuits of the reconfigurable hardware, wherein an effective block selection unit selects one program data memory from the plurality of program data memories and makes it effective;

executing, by the control device that has received the command from the processing device, an activate command controlling the effective block selection unit so as to make a specified program data memory effective and connecting it to the reconfigurable hardware;

switching the content of a logic circuit in the reconfigurable hardware;

interpreting and executing:

an activate command selecting one of said program data memories and activating said processing element to start processing a program held in one of the selected program data memories;

a halt command halting operation of said processing device;

a load_prg command transferring program data from a specified memory device to one of said program data memories, wherein a parameter of the load_prg command indicates a region of one of said program data memories where the program data is stored;

a cancel_prg command canceling a load_prg command, and a wait_prg command waiting until completion of the load_prg command.

17. The computer program product, embodied in a computer readable medium as defined in claim 16, wherein an interrupt command issues an interrupt vector from said control device to said specified processing device.

* * * * *